US011915640B1

(12) United States Patent
Shim et al.

(10) Patent No.: US 11,915,640 B1
(45) Date of Patent: Feb. 27, 2024

(54) PIXEL CIRCUIT AND DISPLAY DEVICE INCLUDING THE SAME

(71) Applicant: Samsung Display Co., Ltd., Yongin-si (KR)

(72) Inventors: Donghwan Shim, Hwaseong-si (KR); Kwangwoo Park, Hwaseong-si (KR); Eonjoo Lee, Hwaseong-si (KR); Jin-Yong Lee, Asan-si (KR); Cheol Jang, Uiwang-si (KR); Yongseon Jo, Seongnam-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/119,498

(22) Filed: Mar. 9, 2023

(30) Foreign Application Priority Data

Aug. 2, 2022 (KR) ........................ 10-2022-0096071

(51) Int. Cl.
*G09G 3/32* (2016.01)

(52) U.S. Cl.
CPC ....... *G09G 3/32* (2013.01); *G09G 2300/0842* (2013.01); *G09G 2310/0267* (2013.01); *G09G 2310/0275* (2013.01); *G09G 2310/0278* (2013.01); *G09G 2310/08* (2013.01)

(58) Field of Classification Search
CPC ............. G09G 3/32; G09G 2300/0842; G09G 2310/0267; G09G 2310/0275; G09G 2310/0278; G09G 2310/08
See application file for complete search history.

(56) References Cited

U.S. PATENT DOCUMENTS

| | | | | |
|---|---|---|---|---|
| 10,748,476 | B2 * | 8/2020 | Zhao | G06V 40/1318 |
| 11,217,151 | B2 * | 1/2022 | Zhang | G09G 3/32 |
| 11,342,519 | B2 * | 5/2022 | Bu | H10K 59/124 |
| 11,715,421 | B2 * | 8/2023 | Kim | G09G 3/3233 345/76 |
| 2019/0347987 | A1 * | 11/2019 | Zhao | G09G 3/3225 |
| 2020/0402449 | A1 * | 12/2020 | Zhang | G09G 3/32 |
| 2021/0336164 | A1 * | 10/2021 | Bu | H10K 59/124 |
| 2022/0148508 | A1 * | 5/2022 | Chi | G09G 3/3233 |

(Continued)

FOREIGN PATENT DOCUMENTS

CN 109671761 A 4/2019

*Primary Examiner* — Michael J Jansen, II
(74) *Attorney, Agent, or Firm* — CANTOR COLBURN LLP

(57) ABSTRACT

A pixel circuit includes a light-emitting element, a write transistor writing a data voltage, a driving transistor generating a driving current based on the data voltage and applying the driving current to the light-emitting element, a first initialization transistor applying a first initialization voltage to a control electrode of the driving transistor, a blocking transistor disposed between the light-emitting element and the driving transistor, a first blocking control transistor including a control electrode connected to the control electrode of the driving transistor, a first electrode receiving a first signal, and a second electrode connected to a control electrode of the blocking transistor, and a second blocking control transistor including a control electrode connected to the control electrode of the driving transistor, a first electrode receiving a second signal, and a second electrode connected to the control electrode of the blocking transistor.

20 Claims, 21 Drawing Sheets

(56) References Cited

U.S. PATENT DOCUMENTS

| | | | | |
|---|---|---|---|---|
| 2023/0078842 | A1* | 3/2023 | Kim | H10K 59/1213 257/443 |
| 2023/0103495 | A1* | 4/2023 | Kim | G09G 3/3233 345/76 |

* cited by examiner

PIXEL CIRCUIT AND DISPLAY DEVICE INCLUDING THE SAME

This application claims priority to Korean Patent Application No. 10-2022-0096071, filed on Aug. 2, 2022, and all the benefits accruing therefrom under 35 U.S.C. § 119, the content of which in its entirety is herein incorporated by reference.

BACKGROUND

1. Field

Embodiments of the inventive concept relate to a pixel circuit and a display device including the pixel circuit. More particularly, embodiments of the inventive concept relate a pixel circuit including a plurality of transistors and a display device including the pixel circuit.

2. Description of the Related Art

Generally, a display device may include a display panel, a timing controller, gate driver, and a data driver. The display panel may include a plurality of gate lines, a plurality of data lines, and a plurality of pixel circuits electrically connected to the gate lines and the data lines. The gate driver may provide gate signals to the gate lines, respectively. The data driver may provide data voltages to the data lines, respectively. The timing controller may control the gate driver and the data driver.

SUMMARY

The pixel circuits may include a plurality of transistors. However, cracks, deformation, etc., may occur in some transistors due to an external impact or the like. Due to this, a bright point may be generated in a displayed image.

Embodiments of the inventive concept provide a pixel circuit including a blocking transistor blocking a driving current.

Embodiments of the inventive concept also provide a display device having a pixel circuit.

In an embodiment of the inventive concept, a pixel circuit includes a light-emitting element, a write transistor which writes a data voltage, a driving transistor which generates a driving current based on the data voltage and applies the driving current to the light-emitting element, a first initialization transistor which applies a first initialization voltage to a control electrode of the driving transistor, a blocking transistor disposed between the light-emitting element and the driving transistor, a first blocking control transistor including a control electrode connected to the control electrode of the driving transistor, a first electrode which receives a first signal, and a second electrode connected to a control electrode of the blocking transistor, and a second blocking control transistor including a control electrode connected to the control electrode of the driving transistor, a first electrode which receives a second signal, and a second electrode connected to the control electrode of the blocking transistor.

In an embodiment, the first blocking control transistor may be a p-type transistor, and the second blocking control transistor may be an n-type transistor.

In an embodiment, the first signal may have an inactivation level in an emission period in which the driving current is generated.

In an embodiment, the second signal may have an activation level in the emission period.

In an embodiment, the write transistor may write the data voltage in response to a write gate signal, and the first signal may be the write gate signal.

In an embodiment, the blocking transistor may be a same type as the write transistor.

In an embodiment, the pixel circuit may further include a second initialization transistor which applies a second initialization voltage to an anode electrode of the light-emitting element in response to a bias gate signal, and the first signal may be the bias gate signal.

In an embodiment, the blocking transistor may be a same type as the second initialization transistor.

In an embodiment, the pixel circuit may further includes a first emission transistor including a control electrode which receives an emission signal, a first electrode which receives a first power voltage, and a second electrode connected to a first electrode of the driving transistor, and a second emission transistor including a control electrode which receives the emission signal, a first electrode connected to a second electrode of the driving transistor, and a second electrode connected to a first electrode of the blocking transistor, and the second signal may be the emission signal.

In an embodiment, the driving transistor may include the control electrode connected to a first node, a first electrode connected to a second node, and a second electrode connected to a third node, the write transistor may include a control electrode which receives a write gate signal, a first electrode which receives the data voltage, and a second electrode connected to the second node, the first initialization transistor may include a control electrode which receives an initialization gate signal, a first electrode which receives the first initialization voltage, and a second electrode connected to the first node, the blocking transistor may include the control electrode, a first electrode connected to a fourth node, and a second electrode connected to a fifth node, and the light-emitting element may include a first electrode connected to the fifth node and a second electrode which receives a second power voltage.

In an embodiment, the pixel circuit may further includes a compensation transistor including a control electrode which receives a compensation gate signal, a first electrode connected to the third node, and a second electrode connected to the first node, a first emission transistor including a control electrode which receives an emission signal, a first electrode which receives a first power voltage, and a second electrode connected to the second node, a second emission transistor including a control electrode which receives the emission signal, a first electrode connected to the third node, and a second electrode connected to the fourth node, a second initialization transistor including a control electrode which receives a bias gate signal, a first electrode which receives a second initialization voltage, and a second electrode connected to the fifth node, and a storage capacitor including a first electrode which receives the first power voltage and a second electrode connected to the first node.

In an embodiment of the inventive concept, a display device includes a display panel including pixel circuits, a data driver which provides a data voltage to each of the pixel circuits, a gate driver which provides gate signals to each of the pixel circuits, and a timing controller which controls the data driver and the gate driver, and each of the pixel circuits may include a light-emitting element, a write transistor which writes the data voltage, a driving transistor which generates a driving current based on the data voltage and applies the driving current to the light-emitting element, a first initialization transistor which applies a first initialization voltage to a control electrode of the driving transistor, a blocking transistor disposed between the light-emitting element and the driving transistor, a first blocking control transistor including a control electrode connected to the control electrode of the driving transistor, a first electrode which receives a first signal, and a second electrode connected to a control electrode of the blocking transistor, and a second blocking control transistor including a control electrode connected to the control electrode of the driving transistor, a first electrode which receives a second signal, and a second electrode connected to the control electrode of the blocking transistor.

In an embodiment, the first blocking control transistor may be a p-type transistor, and the second blocking control transistor may be an n-type transistor.

In an embodiment, the first signal may have an inactivation level in an emission period in which the driving current is generated.

In an embodiment, the second signal may have an activation level in the emission period.

In an embodiment, the gate signals may include a write gate signal, the write transistor may write the data voltage in response to the write gate signal, and the first signal may be the write gate signal.

In an embodiment, the blocking transistor may be a same type as the write transistor.

In an embodiment, the gate signals may include a bias gate signal, each of the pixel circuits may include a second initialization transistor which applies a second initialization voltage to an anode electrode of the light-emitting element in response to the bias gate signal, and the first signal may be the bias gate signal.

In an embodiment, the blocking transistor may be a same type as the second initialization transistor.

In an embodiment, the display device may further includes an emission driver which provides an emission signal to each of the pixel circuits, the pixel circuits may include a first emission transistor including a control electrode which receives the emission signal, a first electrode which receives a first power voltage, and a second electrode connected to a first electrode of the driving transistor, and a second emission transistor including a control electrode which receives the emission signal, a first electrode connected to a second electrode of the driving transistor, and a second electrode connected to a first electrode of the blocking transistor, and the second signal may be the emission signal.

Therefore, the pixel circuit may block a driving current flowing to a light-emitting element when a data voltage is not written by including the light-emitting element, a write transistor which writes the data voltage, a driving transistor which generates the driving current based on the data voltage and applies the driving current to the light-emitting element, a first initialization transistor which applies a first initialization voltage to a control electrode of the driving transistor, a blocking transistor disposed between the light-emitting element and the driving transistor, a first blocking control transistor including a control electrode connected to the control electrode of the driving transistor, a first electrode which receives a first signal, and a second electrode connected to a control electrode of the blocking transistor, and a second blocking control transistor including a control electrode connected to the control electrode of the driving transistor, a first electrode which receives a second signal, and a second electrode connected to the control electrode of the blocking transistor.

In addition, the display device may prevent bright spots generated when a crack, deformation, etc. occurs in a transistor included in the pixel circuit by including a pixel circuit blocking a driving current flowing to a light-emitting element when a data voltage is not written.

However, the effects of the inventive concept are not limited to the above-described effects, and may be variously expanded without departing from the spirit and scope of the inventive concept.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
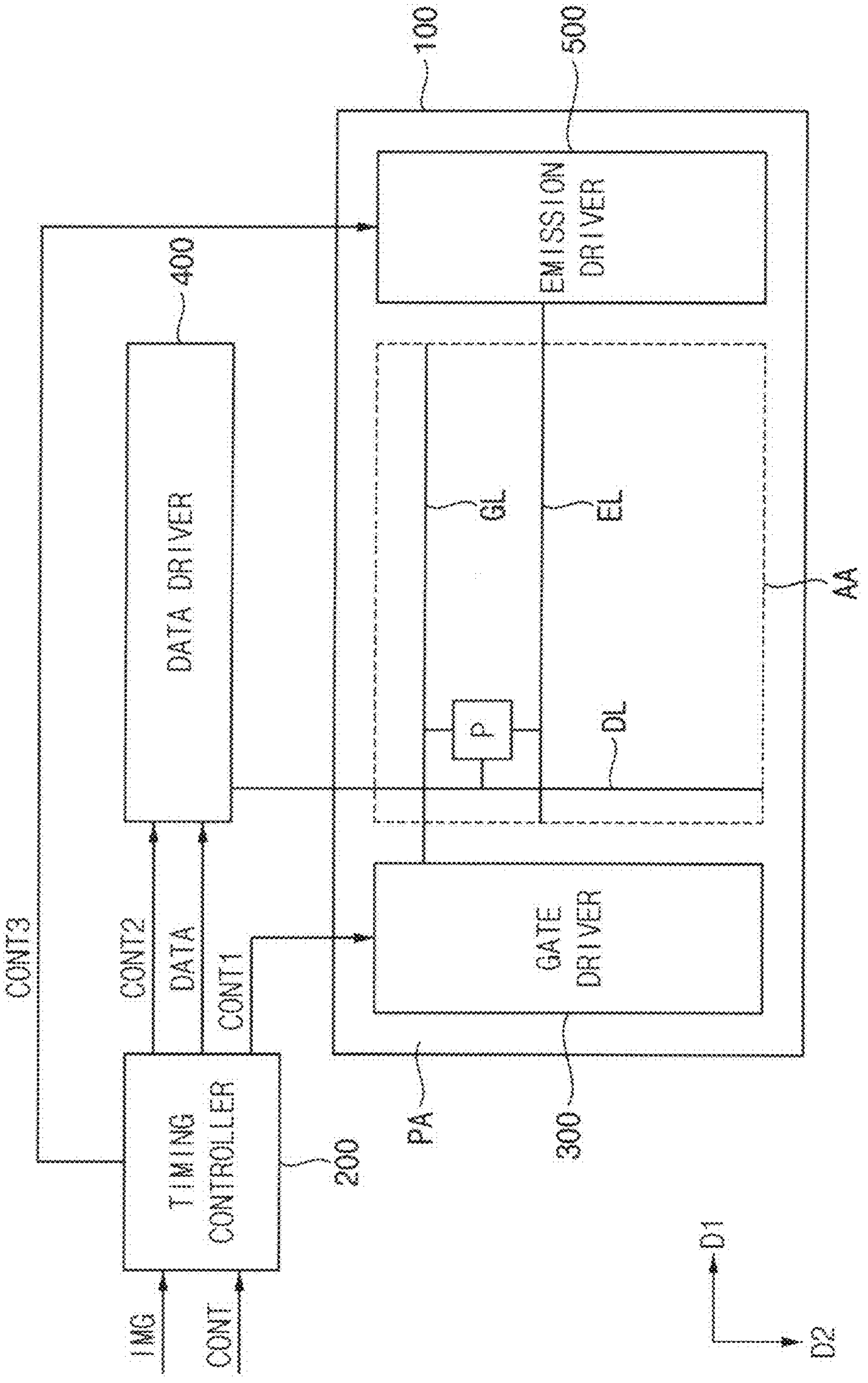
FIG. 1 is a block diagram illustrating an embodiment of a display device according to the inventive concept.

Hereinafter, the inventive concept will be explained in detail with reference to the accompanying drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a block diagram illustrating an embodiment of a display device according to the inventive concept.

Referring to FIG. 1, the display device may include a display panel 100, a timing controller 200, a gate driver 300, a data driver 400, and an emission driver 500. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 and the emission driver 500 may be disposed (e.g., mounted) on the peripheral region PA of the display panel 100.

The display panel 100 may include a plurality of gate lines GL, a plurality of data lines DL, a plurality of emission lines EL, and a plurality of pixel circuits P electrically connected to the data lines DL, the gate lines GL, and the emission lines EL. The gate lines GL and the emission lines EL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). In an embodiment, the input image data IMG may include red image data, green image data and blue image data, for example. In an embodiment, the input image data IMG may further include white image data. In another embodiment the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may generate the third control signal CONT3 for controlling operation of the emission driver 500 based on the input control signal CONT and output the third control signal CONT3 to the emission driver 500. The third control signal CONT3 may include a vertical start signal and an emission clock signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. In an embodiment, the gate driver 300 may sequentially output the gate signals to the gate lines GL, for example.

The data driver 400 may receive the second control signal CONT2 and the data signal DATA from the timing controller 200. The data driver 400 may convert the data signal DATA into data voltages having an analog type. The data driver 400 may output the data voltage to the data lines DL.

The emission driver 500 may generate gate signals for driving the emission lines EL in response to the third control signal CONT3 input from the timing controller 200. The emission driver 500 may output the emission signals to the emission lines EL. In an embodiment, the emission driver 500 may sequentially output the emission signals to the emission lines EL, for example.

Figure 2:
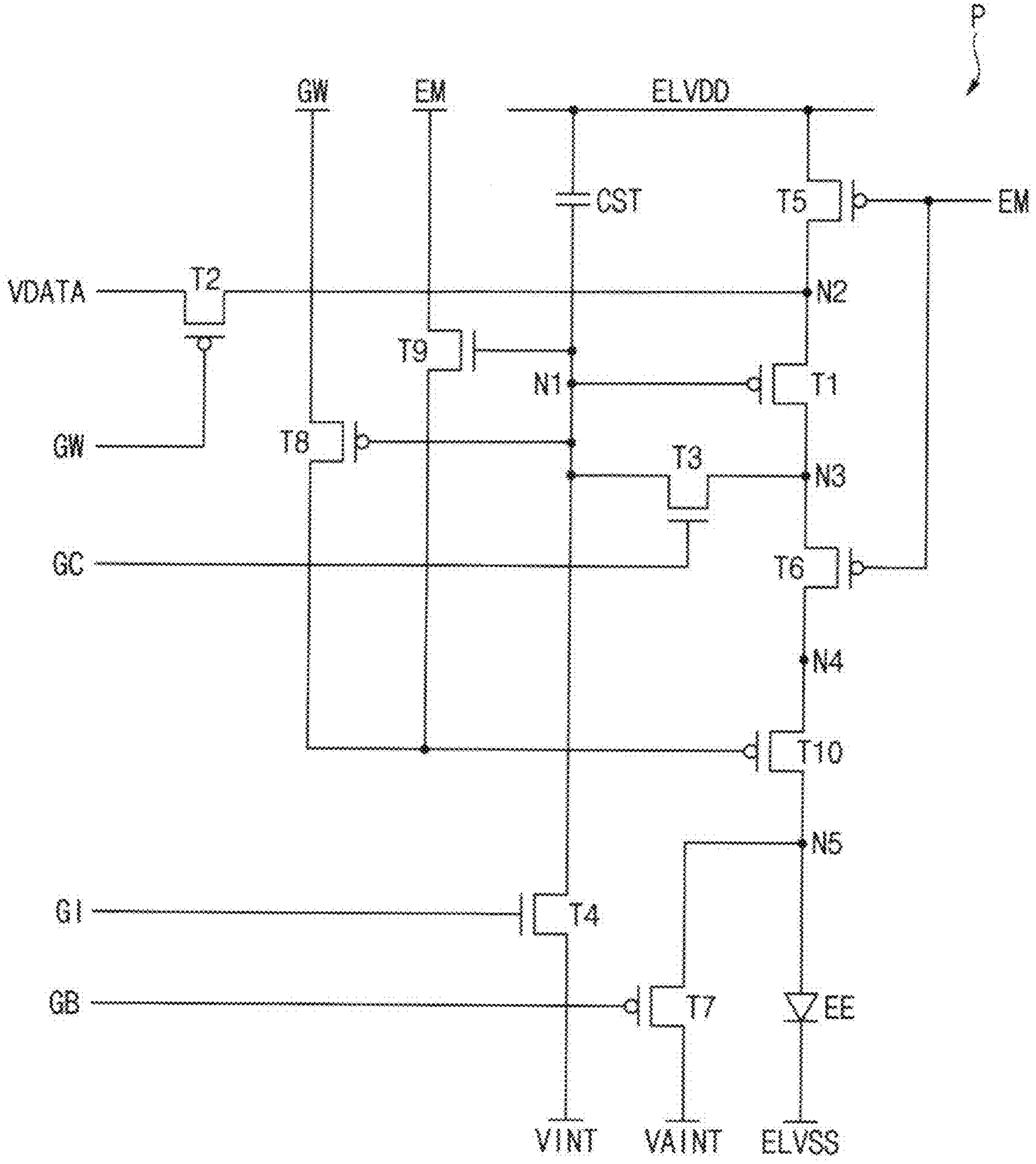
FIG. 2 is a circuit diagram illustrating an embodiment of pixel circuits of the display device of FIG. 1.

FIG. 2 is a circuit diagram illustrating an embodiment of the pixel circuits P of the display device of FIG. 1.

Referring to FIG. 2, each of the pixel circuits P may include a light-emitting element EE, a write transistor T2 writing the data voltage VDATA, a driving transistor T1 generating a driving current based on the data voltage VDATA and applying the driving current to the light-emitting element EE, a first initialization transistor T4 applying a first initialization voltage VINT to a control electrode of the driving transistor T1, a blocking transistor T10 disposed between the light-emitting element EE and the driving transistor T1, a first blocking control transistor T8 including a control electrode connected to the control electrode of the driving transistor T1, a first electrode receiving a first signal, and a second electrode connected to a control electrode of the blocking transistor T10, and a second blocking control transistor T9 including a control electrode connected to the control electrode of the driving transistor T1, a first electrode receiving a second signal, and a second electrode connected to the control electrode of the blocking transistor T10.

In an embodiment, the driving transistor T1 may include the control electrode connected to a first node N1, a first electrode connected to a second node N2, and a second electrode connected to a third node N3, the write transistor T2 may include a control electrode receiving a write gate signal GW, a first electrode receiving the data voltage VDATA, and a second electrode connected to the second node N2, the first initialization transistor T4 may include a control electrode receiving an initialization gate signal GI, a first electrode receiving the first initialization voltage VINT, and a second electrode connected to the first node N1, the blocking transistor T10 may include the control electrode, a first electrode connected to a fourth node N4, and a second electrode connected to a fifth node N5, and the light-emitting element EE may include a first electrode connected to the fifth node N5 and a second electrode receive a second power voltage ELVSS (e.g., a low power voltage), for example.

The write transistor T2 may write the data voltage VDATA in response to the write gate signal GW, and the first signal may be the write gate signal GW. That is, the first electrode of the first blocking control transistor T8 may receive the write gate signal GW. In this case, the blocking transistor T10 may be the same type as the write transistor T2. In an embodiment, the write transistor T2 and the blocking transistor T10 may be p-type transistors, for example.

Each of the pixel circuits P may include a first emission transistor T5 including a control electrode receiving the emission signal EM, a first electrode receiving a first power voltage ELVDD (e.g., a high power voltage), and a second electrode connected to a first electrode of the driving transistor T1, and a second emission transistor T6 including a control electrode receiving the emission signal EM, a first electrode connected to the second electrode of the driving transistor T1, and a second electrode connected to the first electrode of the blocking transistor T10, and the second signal may be the emission signal EM. That is, the second electrode of the second blocking control transistor T9 may receive the emission signal EM.

Each of the pixel circuits P may include a compensation transistor T3 including a control electrode receiving a compensation gate signal GC, a first electrode connected to the third node N3, and a second electrode connected to the first node N1, a second initialization transistor T7 including a control electrode receiving a bias gate signal GB, a first electrode receiving a second initialization voltage VAINT, and a second electrode connected to the fifth node N5, and a storage capacitor CST including a first electrode receiving the first power voltage ELVDD and a second electrode connected to the first node N1.

The first blocking control transistor T8 may be a p-type transistor, and the second blocking control transistor T9 may be an n-type transistor. In an embodiment, when a signal applied to the control electrode of the n-type transistor has a high voltage level, the n-type transistor may be turned on, for example. That is, in the case of the n-type transistor, the activation level may be the high voltage level. In an embodiment, when a signal applied to the control electrode of the p-type transistor has a low voltage level, the p-type transistor may be turned on. That is, in the case of the p-type transistor, the activation level may be the low voltage level, for example. Accordingly, since both the control electrode of the first blocking control transistor T8 and the control electrode of the second blocking control transistor T9 are connected to the first node N1, the second blocking control transistor T9 may be turned off when the first blocking control transistor T8 is turned on, and the first blocking control transistor T8 may be turned off when the second blocking control transistor T9 is turned on.

Hereinafter, the high voltage level is a voltage sufficient to turn on the n-type transistor, and the low voltage level is a voltage sufficient to turn on the p-type transistor. The driving transistor T1, the first emission transistor T5, the second emission transistor T6, and the second initialization transistor T7 may be the p-type transistors. The compensation transistor T3 and the first initialization transistor T4 may be the n-type transistors. However, the inventive concept is not limited thereto.

Figure 3:
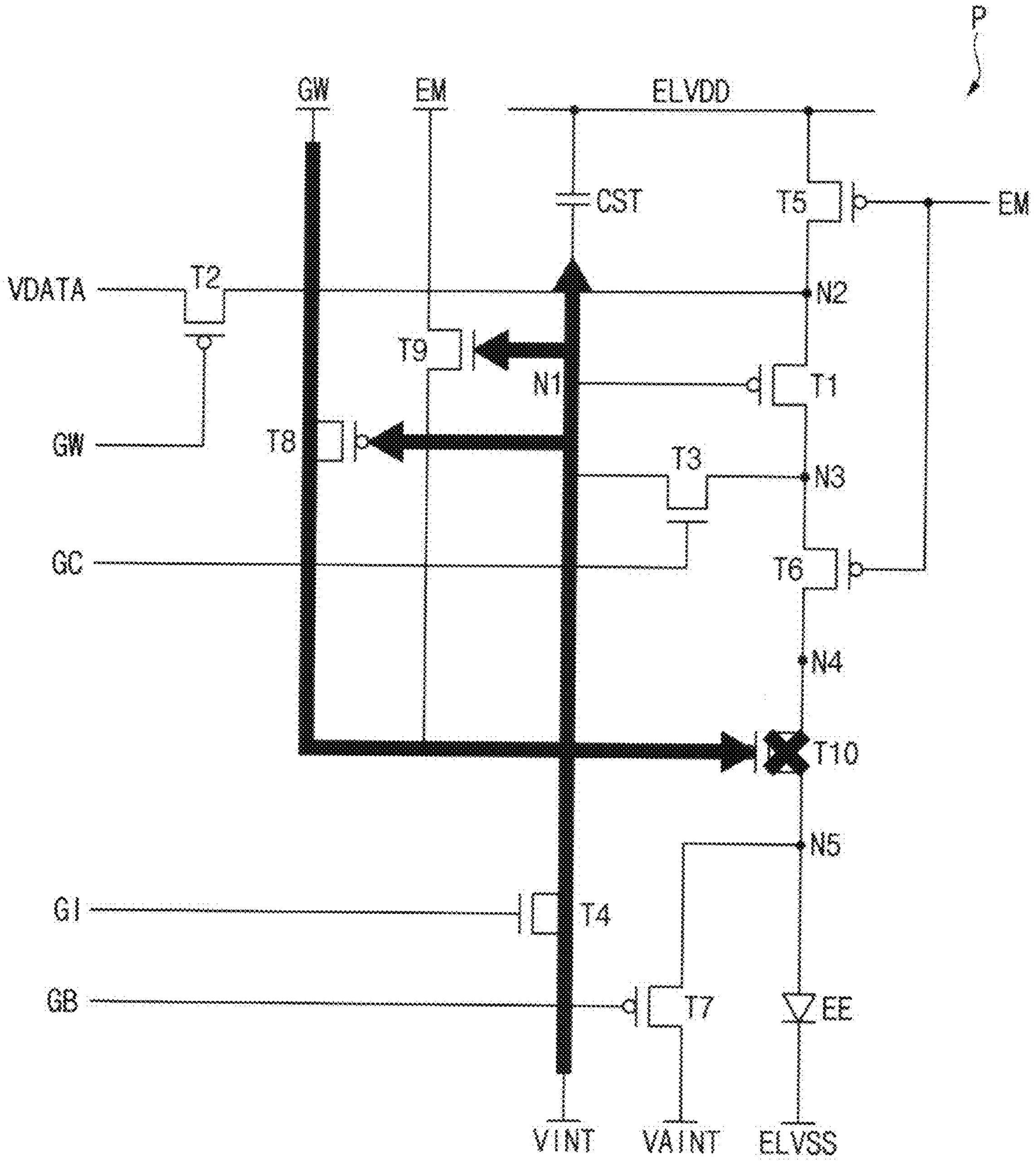
FIGS. 3 and 4 are diagrams illustrating an embodiment in which the display device of FIG. 1 drives a pixel circuit in an initialization period when the display device of FIG. 1 is in a normal state.
Figure 4:
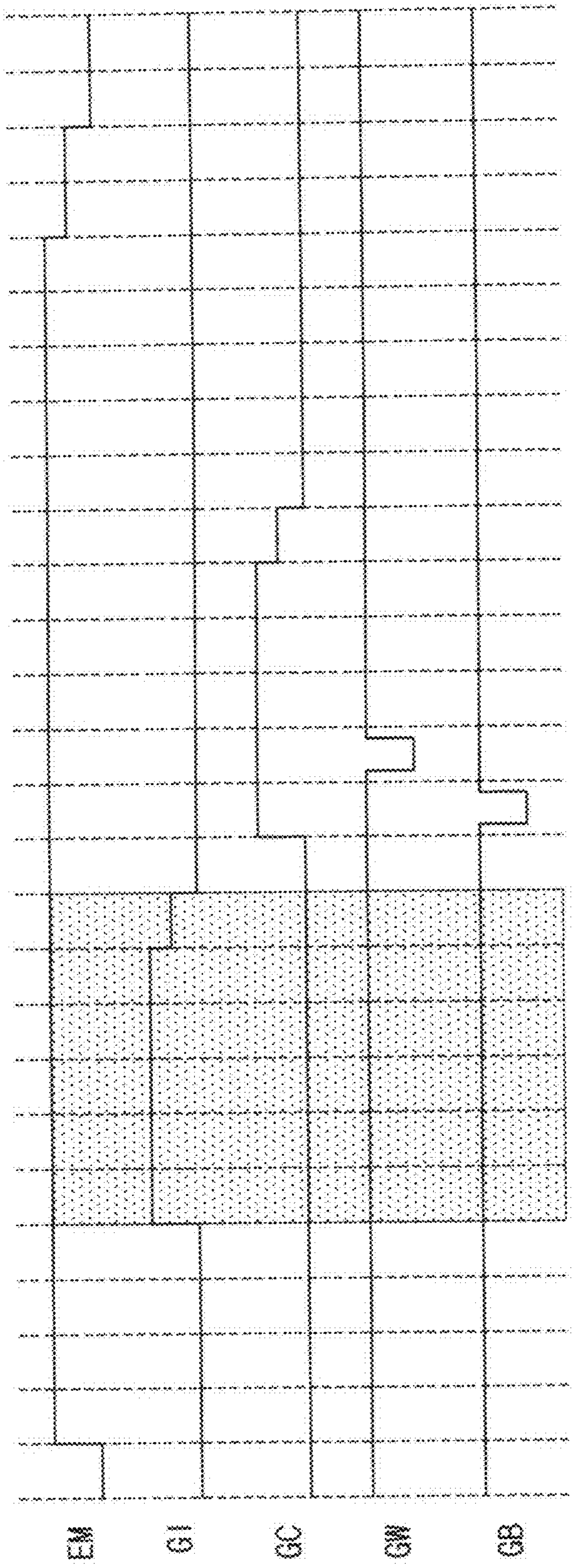

FIGS. 3 and 4 are diagrams illustrating an embodiment in which the display device of FIG. 1 drives the pixel circuit P in an initialization period when the display device of FIG. 1 is in a normal state. Here, the normal state may be a state in which all transistors of the pixel circuit P operate normally.

Referring to FIGS. 3 and 4, in the initialization period, the initialization gate signal GI may have the high voltage level, and the first initialization transistor T4 may be turned on. Accordingly, the first initialization voltage (hereinafter also referred to as a gate initialization voltage) VINT may be applied to the first node N1 (i.e., a gate initialization operation). That is, the control electrode of the driving transistor T1 (i.e., the data voltage VDATA written in the storage capacitor CST) may be initialized.

The first initialization voltage VINT may be the low power voltage. Accordingly, the first initialization voltage VINT may have the low voltage level, and the first blocking control transistor T8 may be turned on. Accordingly, the write gate signal GW may be applied to the control electrode of the blocking transistor T10. At this time, since the write gate signal GW has the high voltage level, the blocking transistor T10 may be turned off.

Figure 5:
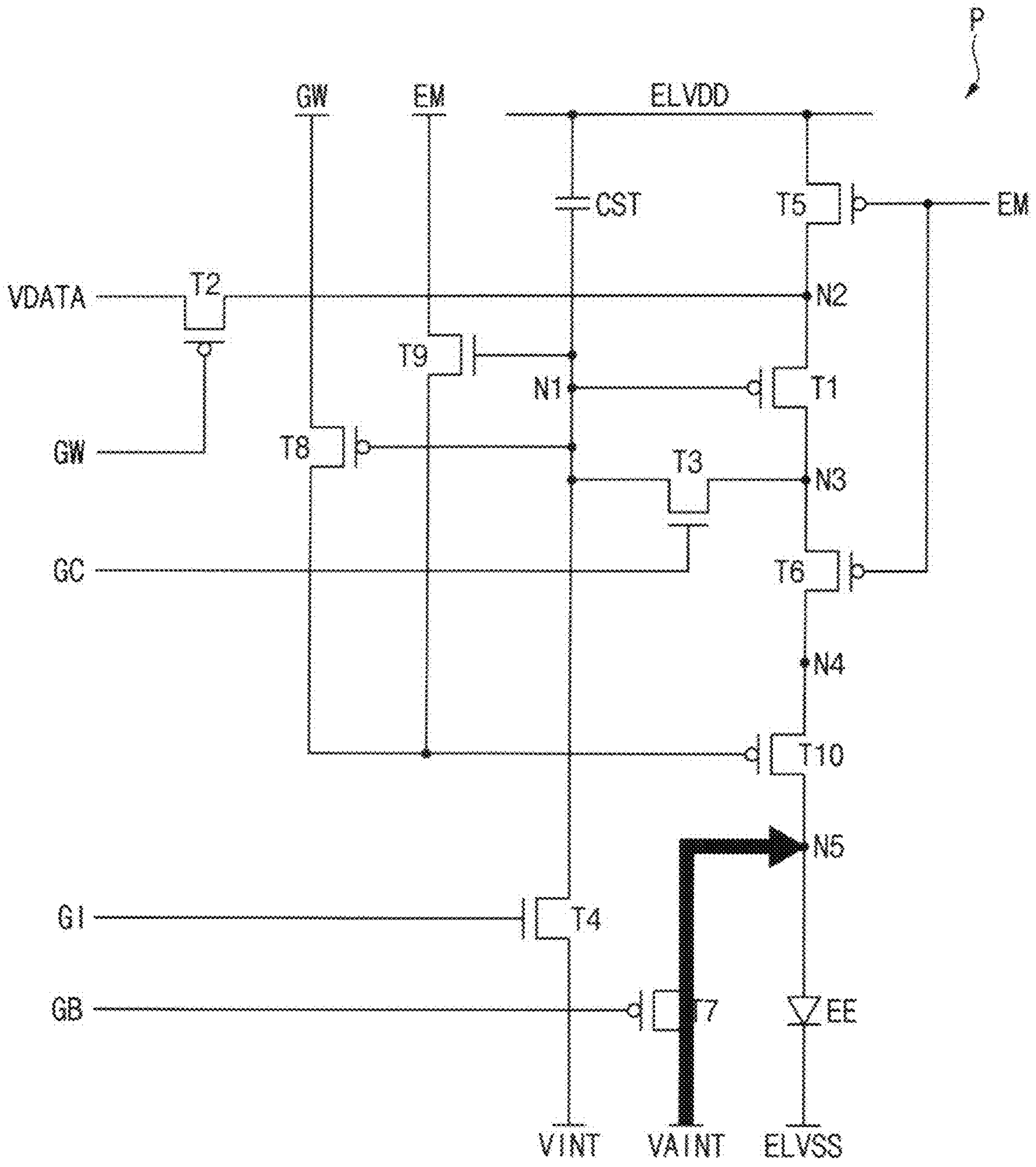
FIGS. 5 and 6 are diagrams illustrating an embodiment in which the display device of FIG. 1 drives a pixel circuit in an anode initialization period when the display device of FIG. 1 is in a normal state.
Figure 6:
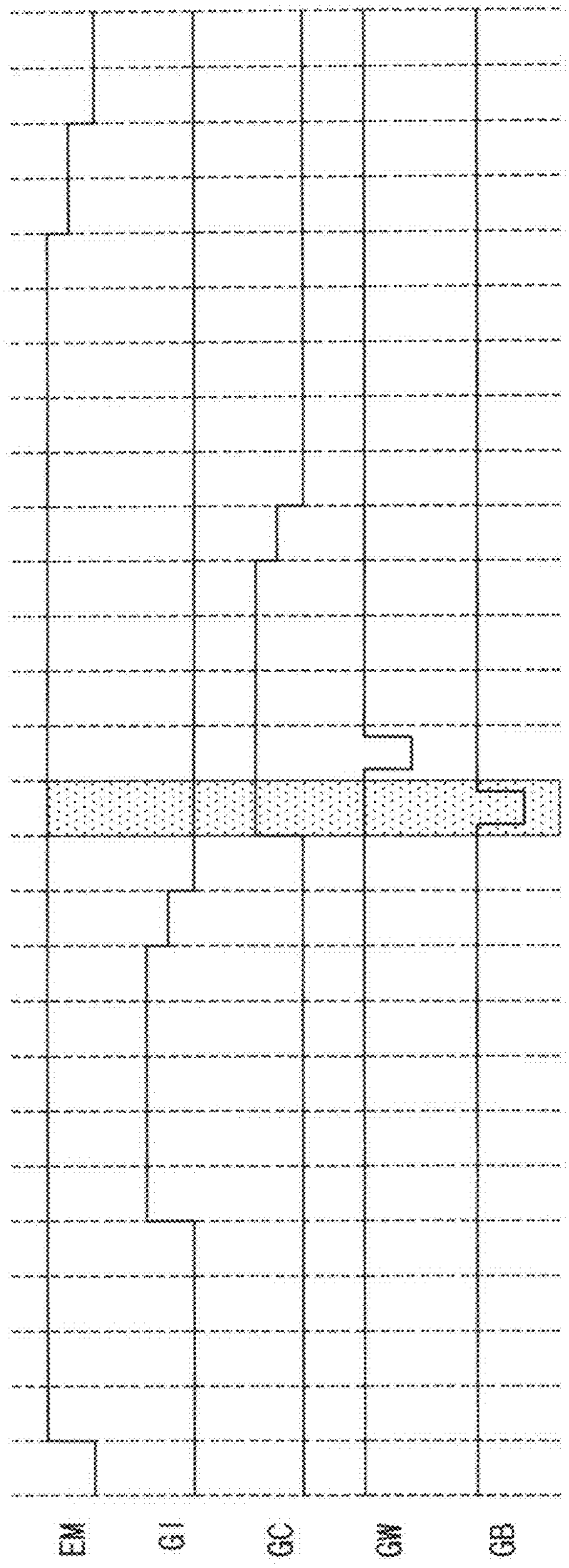

FIGS. 5 and 6 are diagrams illustrating an embodiment in which the display device of FIG. 1 drives the pixel circuit P in an anode initialization period when the display device of FIG. 1 is in the normal state.

Referring to FIGS. 5 and 6, in the anode initialization period, the bias gate signal GB may have the low voltage level, and the second initialization transistor T7 may be turned on. Accordingly, the anode initialization voltage VAINT may be applied to the first electrode (i.e., an anode electrode) of the light-emitting element EE (i.e., an anode initialization operation).

Figure 7:
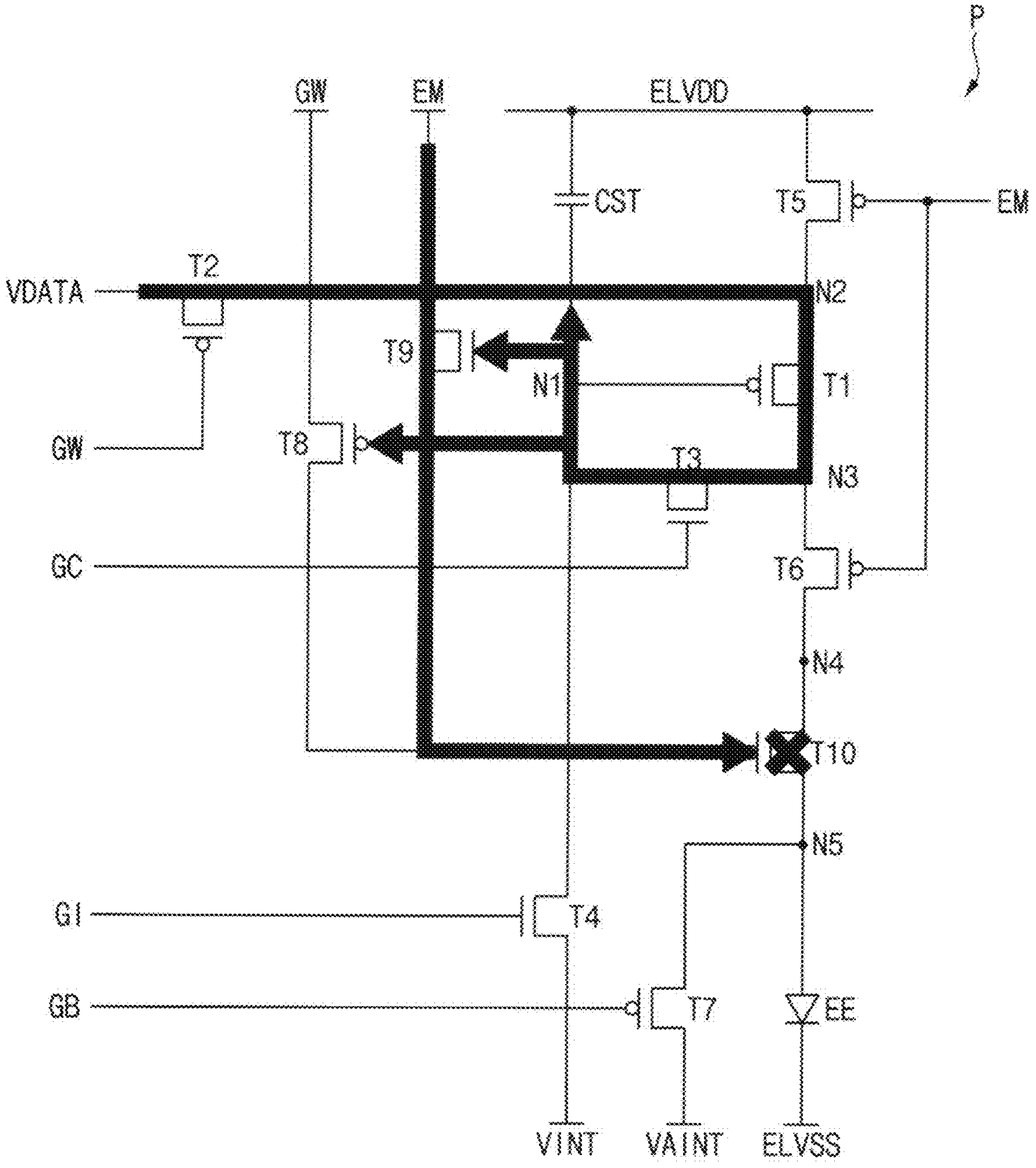
FIGS. 7 and 8 are diagrams illustrating an embodiment in which the display device of FIG. 1 drives a pixel circuit in a data writing period when the display device of FIG. 1 is in a normal state.
Figure 8:
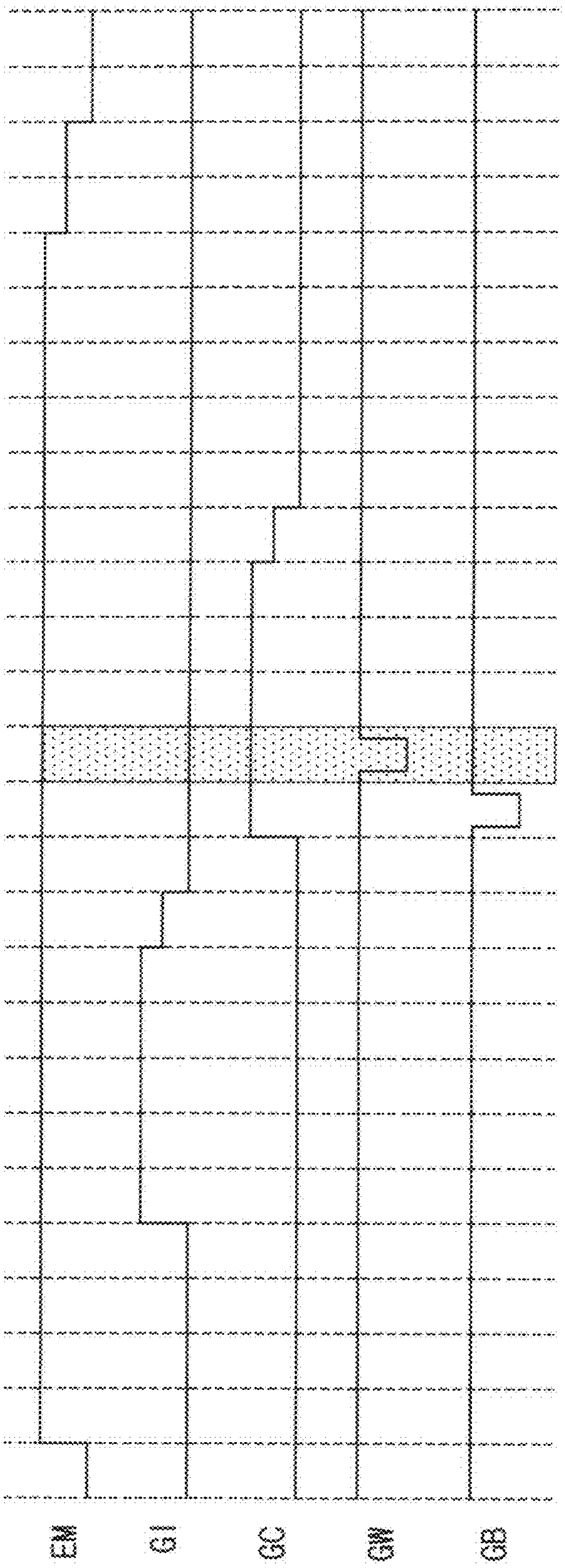

FIGS. 7 and 8 are diagrams illustrating an embodiment in which the display device of FIG. 1 drives the pixel circuit P in a data writing period when the display device of FIG. 1 is in the normal state.

Referring to FIGS. 7 and 8, in the data writing period, the write gate signal GW may have the low voltage level, the compensation gate signal GC may have the high voltage level, and the write transistor T2 and the compensation transistor T3 may be turned on. Accordingly, the data voltage VDATA may be written in the storage capacitor CST (i.e., a data write operation).

When the data voltage VDATA is written in the storage capacitor CST, a voltage of the first node N1 may have the high voltage level. Accordingly, the second blocking control transistor T9 may be turned on. Accordingly, the emission signal EM may be applied to the control electrode of the blocking transistor T10. At this time, since the emission signal EM has the high voltage level, the blocking transistor T10 may be turned off.

Figure 9:
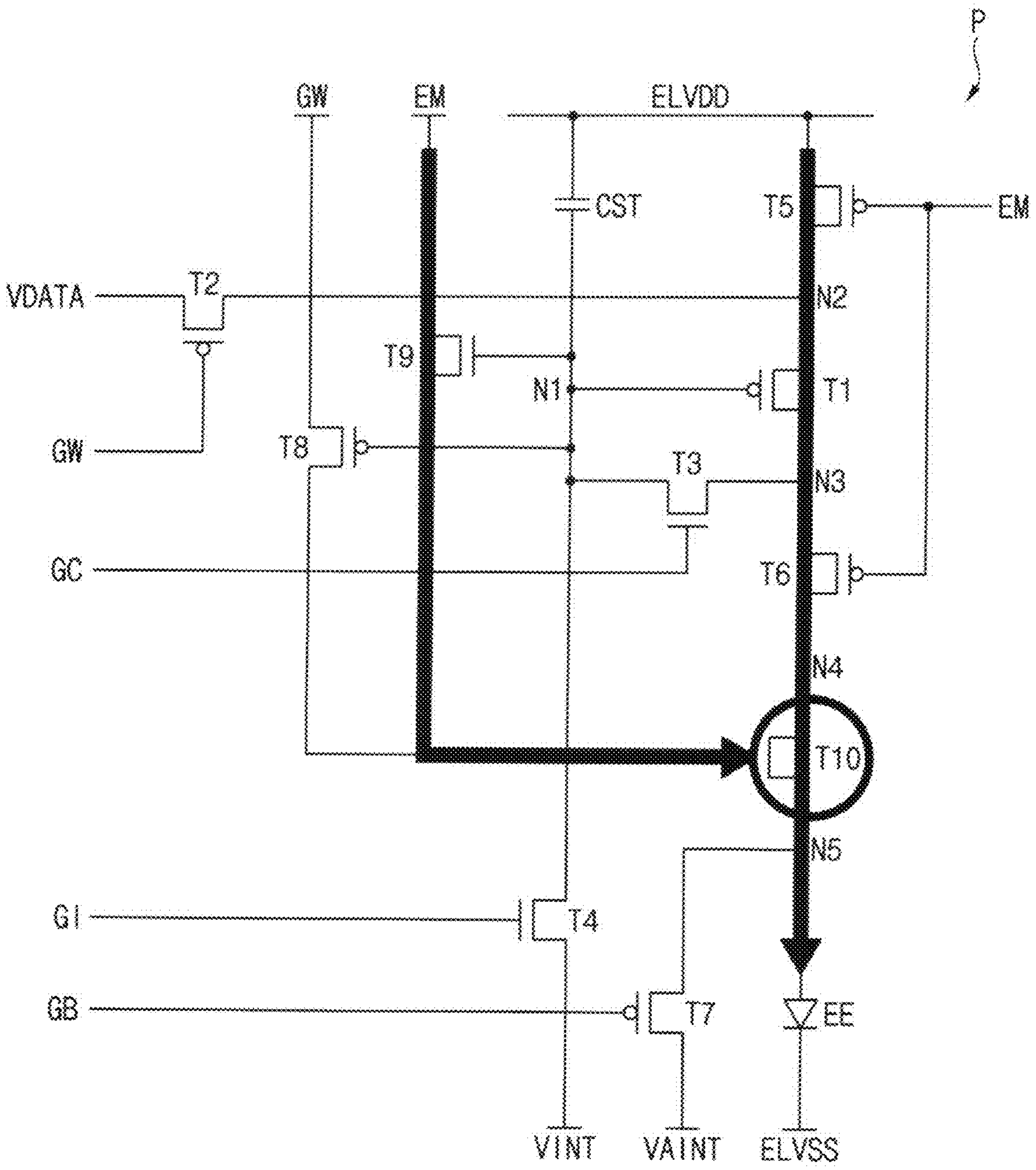
FIGS. 9 and 10 are diagrams illustrating an embodiment in which the display device of FIG. 1 drives a pixel circuit in an emission period when the display device of FIG. 1 is in a normal state.
Figure 10:
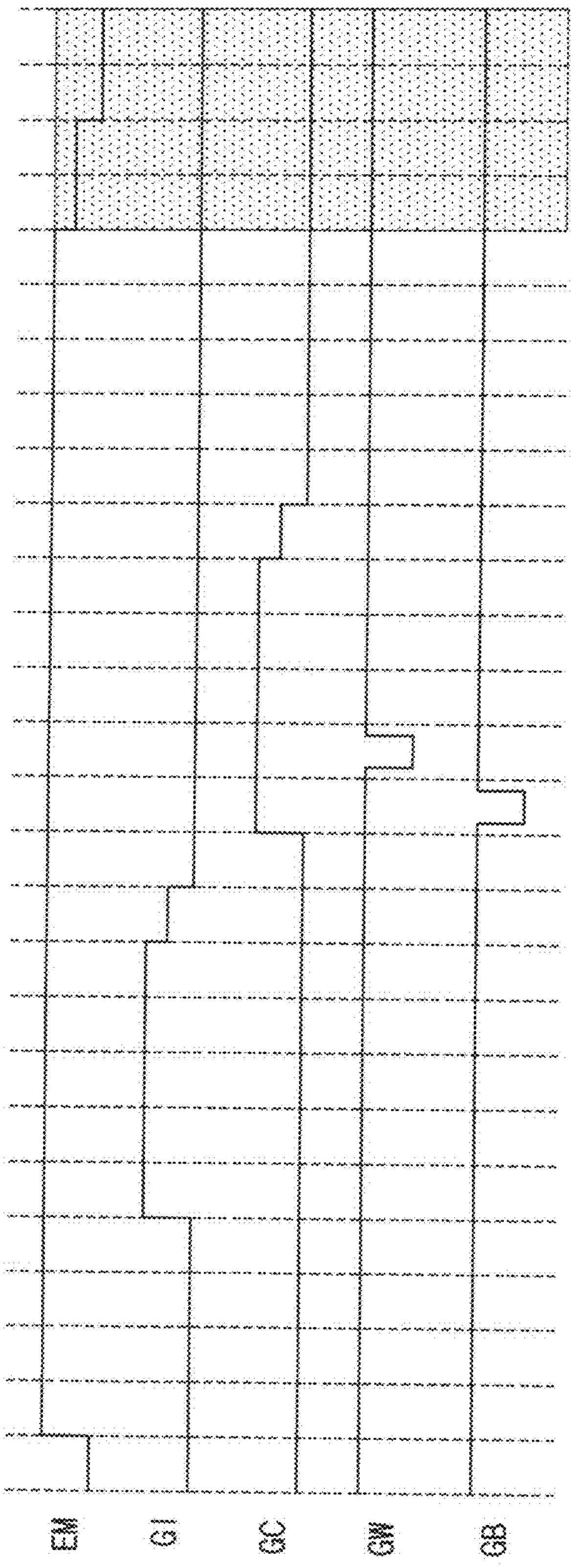

FIGS. 9 and 10 are diagrams illustrating an embodiment in which the display device of FIG. 1 drives the pixel circuit P in an emission period when the display device of FIG. 1 is in the normal state.

Referring to FIGS. 9 and 10, in the emission period, the emission signal EM may have the low voltage level, and the first emission transistor T5 and the second emission transistor T6 may be turned on. Accordingly, the first power voltage ELVDD may be applied to the driving transistor T1 to generate the driving current, and the driving current may be applied to the light-emitting element EE (i.e., a light-emitting operation). That is, the light-emitting element EE may emit light with a luminance corresponding to the driving current.

The first signal (here, the write gate signal GW) may have an inactivation level in the emission period in which the driving current is generated. The second signal (here, the emission signal EM) may have an activation level in the emission period in which the driving current is generated.

In an embodiment, since the data voltage VDATA is written in the storage capacitor CST, the voltage of the first node N1 may have the high voltage level, for example. Accordingly, the second blocking control transistor T9 may be turned on. And, the emission signal EM may be applied to the control electrode of the blocking transistor T10. At this time, since the emission signal EM has the low voltage level, the blocking transistor T10 may be turned on.

Figure 11:
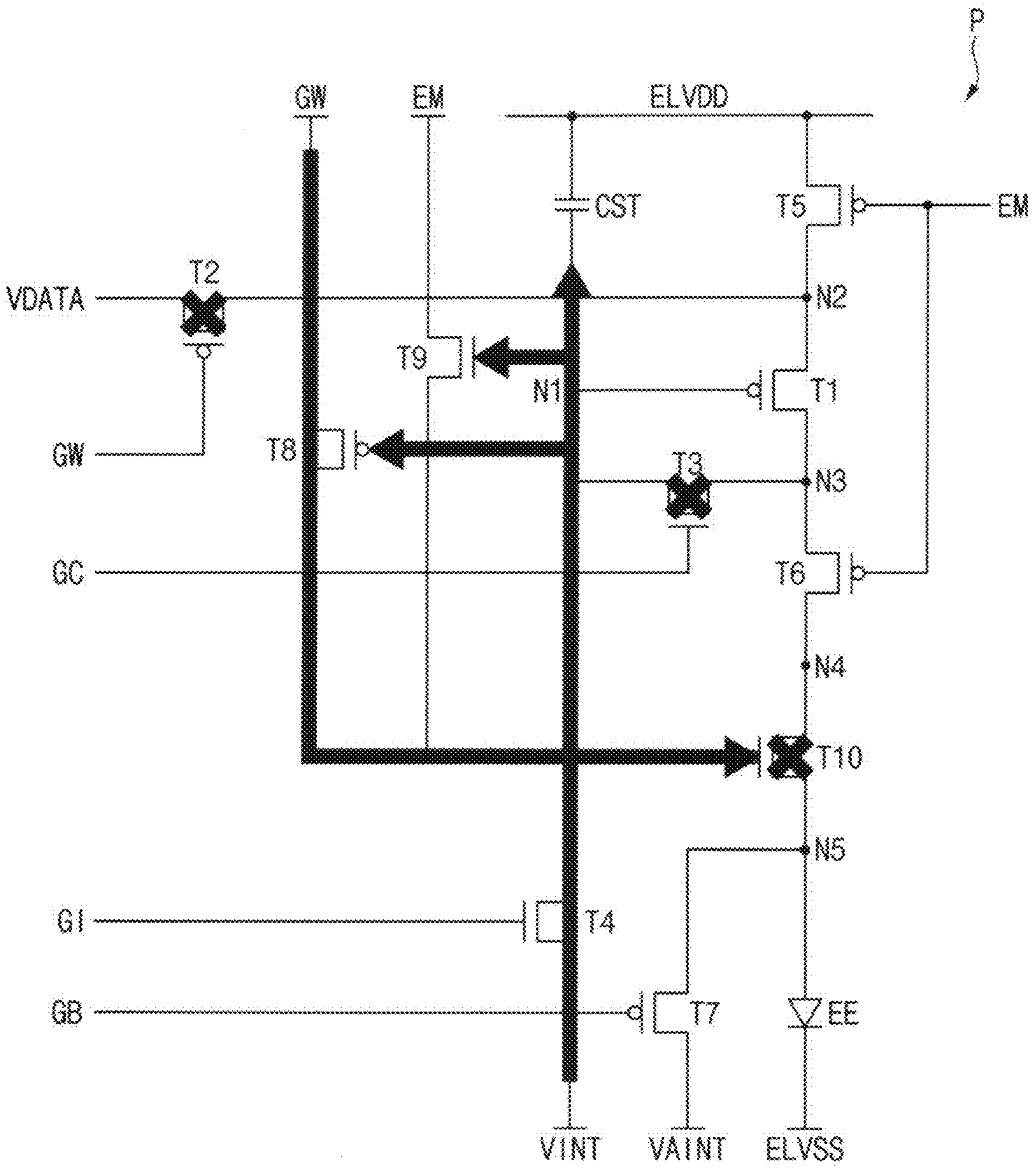
FIG. 11 is a circuit diagram illustrating an embodiment in which the display device of FIG. 1 drives a pixel circuit in an initialization period when a write transistor and a compensation transistor are opened.

FIG. 11 is a circuit diagram illustrating an embodiment in which the display device of FIG. 1 drives the pixel circuit P in the initialization period when the write transistor T2 and the compensation transistor T3 are opened.

Referring to FIG. 11, in the initialization period, the initialization gate signal GI may have the high voltage level, and the first initialization transistor T4 may be turned on. Accordingly, the gate initialization voltage VINT may be applied to the first node N1 (i.e., the gate initialization operation). That is, the control electrode of the driving transistor T1 (i.e., the data voltage VDATA written in the storage capacitor CST) may be initialized.

The first initialization voltage VINT may be the low power voltage. Accordingly, the first initialization voltage VINT may have the low voltage level, and the first blocking control transistor T8 may be turned on. Accordingly, the write gate signal GW may be applied to the control electrode of the blocking transistor T10. At this time, since the write gate signal GW has the high voltage level, the blocking transistor T10 may be turned off.

Figure 12:
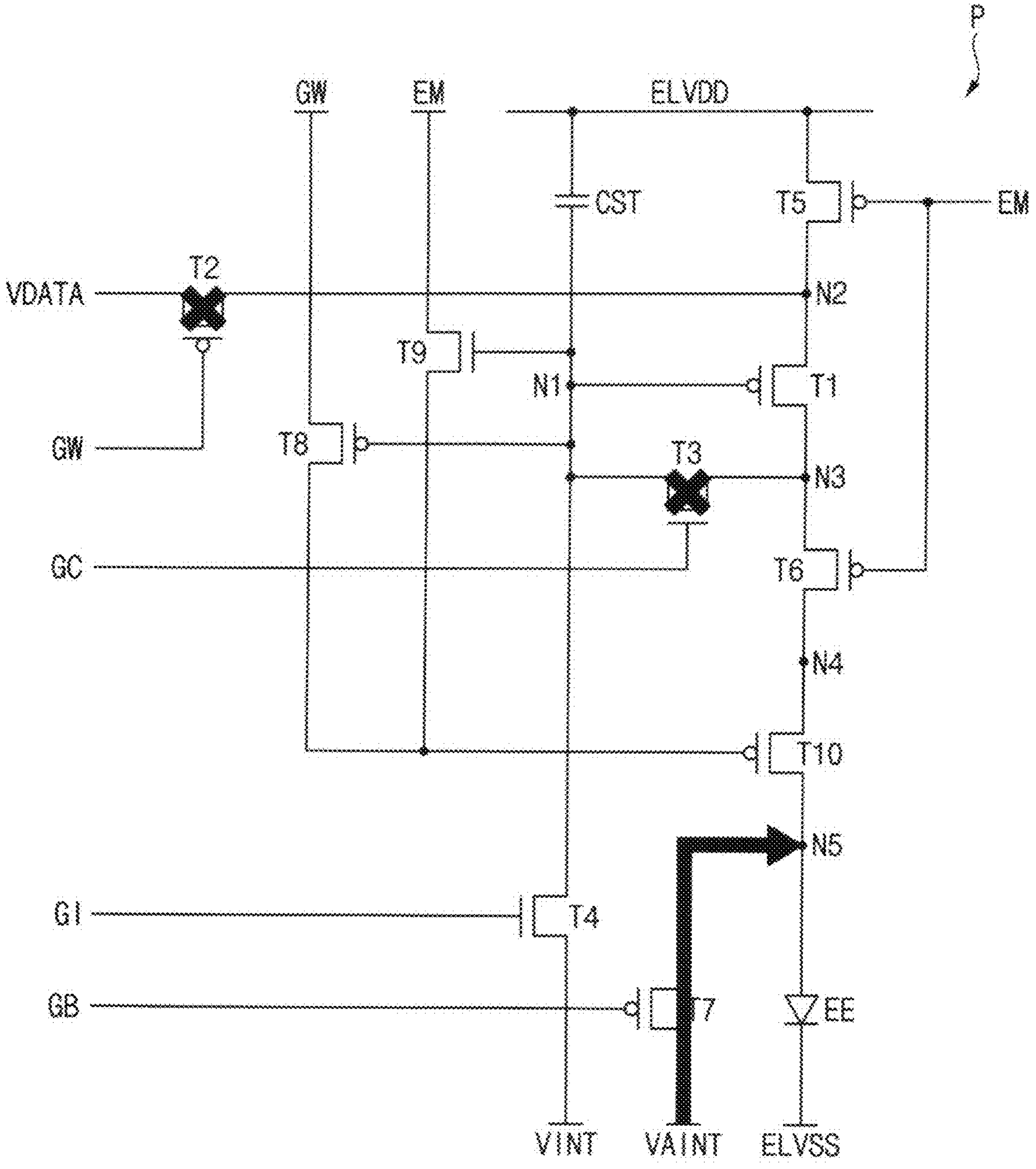
FIG. 12 is a diagram illustrating an embodiment in which the display device of FIG. 1 drives a pixel circuit in an anode initialization period when a write transistor and a compensation transistor are opened.

FIG. 12 is a diagram illustrating an embodiment in which the display device of FIG. 1 drives the pixel circuit P in the anode initialization period when the write transistor T2 and the compensation transistor T3 are opened.

Referring to FIG. 12, in the anode initialization period, the bias gate signal GB may have the low voltage level, and the second initialization transistor T7 may be turned on. Accordingly, the anode initialization voltage VAINT may be applied to the first electrode (i.e., the anode electrode) of the light-emitting element EE (i.e., the anode initialization operation).

Figure 13:
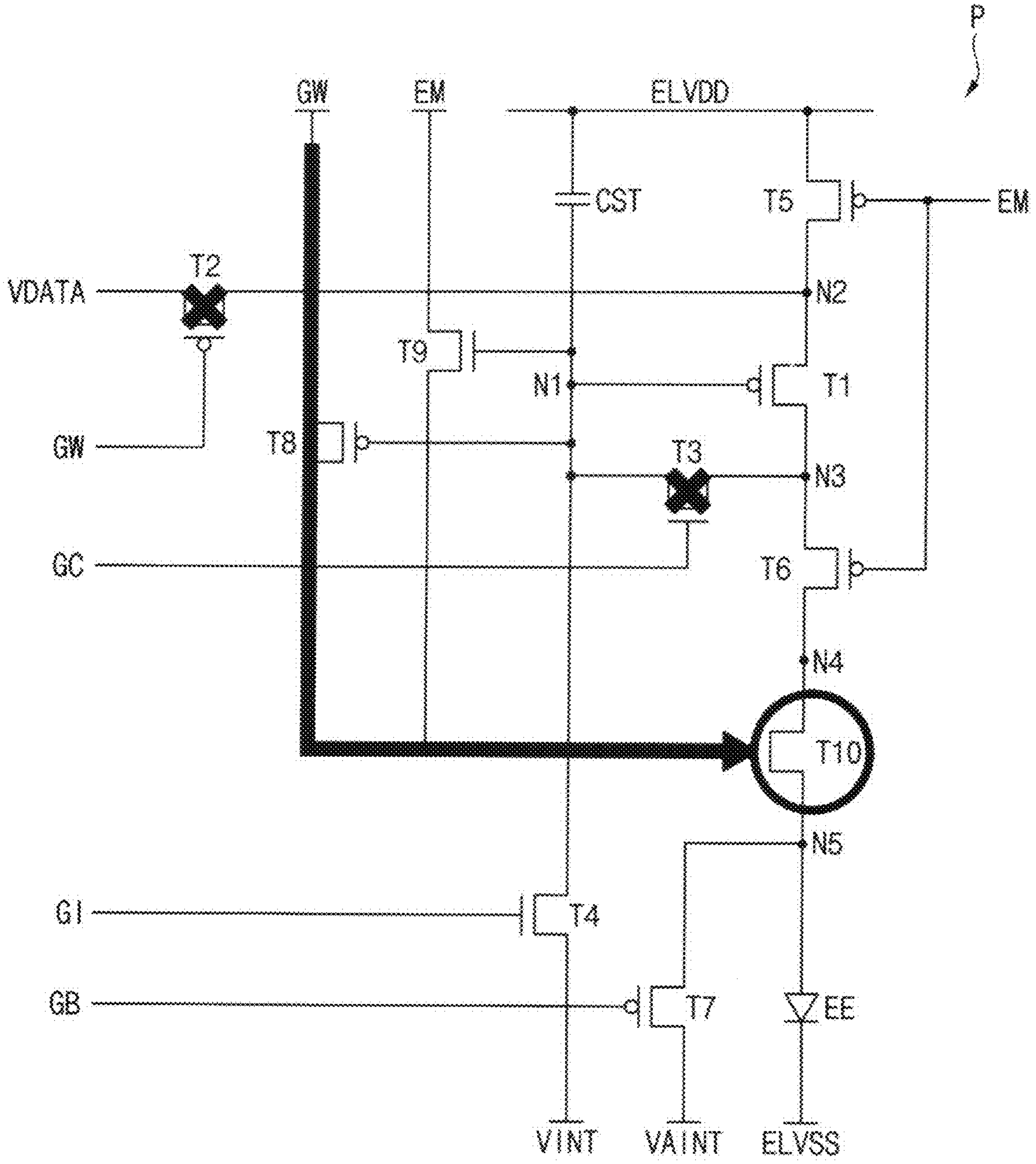
FIG. 13 is a diagram illustrating an embodiment in which the display device of FIG. 1 drives a pixel circuit in a data write period when a write transistor and a compensation transistor are opened.

FIG. 13 is a diagram illustrating an embodiment in which the display device of FIG. 1 drives the pixel circuit P in the data write period when the write transistor T2 and the compensation transistor T3 are opened.

Referring to FIG. 13, in the data write period, since the write transistor T2 and the compensation transistor T3 are opened, the data voltage VDATA may not be written.

Since the data voltage VDATA is not written in the storage capacitor CST, the voltage of the first node N1 may still have the low voltage level (i.e., the first initialization voltage VINT). Accordingly, the first blocking control transistor T8 may be turned on. Accordingly, the write gate signal GW may be applied to the control electrode of the blocking transistor T10. At this time, since the write gate signal GW has the low voltage level, the blocking transistor T10 may be turned on.

Figure 14:
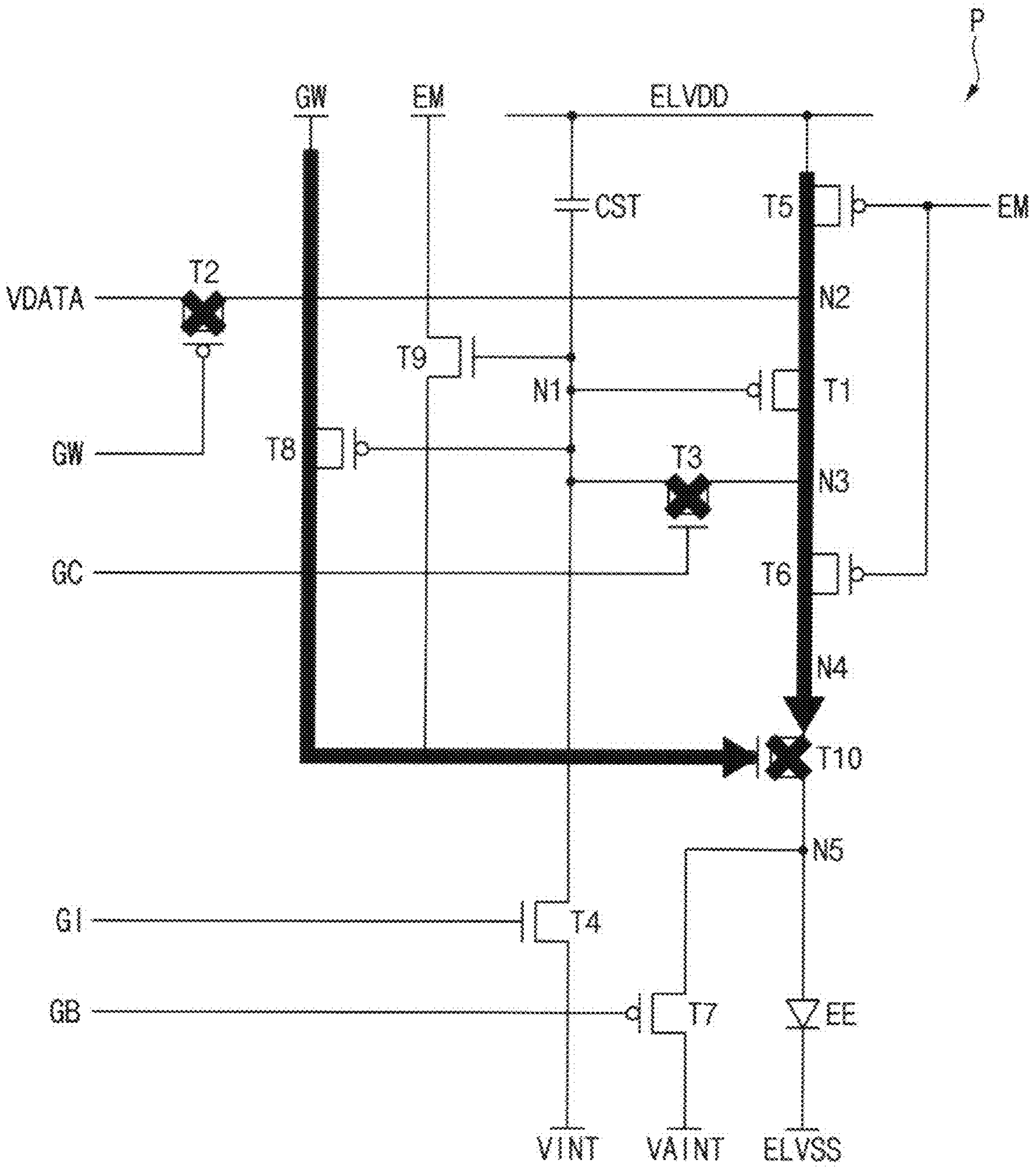
FIG. 14 is a diagram illustrating an embodiment in which the display device of FIG. 1 drives a pixel circuit in an emission period when a write transistor and a compensation transistor are opened.

FIG. 14 is a diagram illustrating an embodiment in which the display device of FIG. 1 drives the pixel circuit P in the emission period when the write transistor T2 and the compensation transistor T3 are opened.

Referring to FIG. 14, in the emission period, the emission signal EM may have the low voltage level, and the first emission transistor T5 and the second emission transistor T6 may be turned on. Accordingly, the first power voltage ELVDD may be applied to the driving transistor T1 to generate the driving current. However, since the voltage stored in the storage capacitor CST is the first initialization voltage VINT and the driving transistor T1 is the p-type transistor, the driving current may be substantially large. Accordingly, when the driving current flows to the light-emitting element EE, a bright point may be generated due to the corresponding pixel circuit P.

However, since the first initialization voltage VINT is stored in the storage capacitor CST, the voltage of the first node N1 may have the low voltage level. Accordingly, the first blocking control transistor T8 may be turned on. Accordingly, the write gate signal GW may be applied to the control electrode of the blocking transistor T10. At this time, since the write gate signal GW has the high voltage level, the blocking transistor T10 may be turned off. Accordingly, the driving current may be blocked.

That is, when a voltage of the control electrode of the driving transistor T1 has the low voltage level (e.g., the first initialization voltage VINT) in the emission period, the first signal may turn off the blocking transistor T10 to block the driving current. In addition, when the voltage of the control electrode of the driving transistor T1 has the high voltage level (e.g., the data voltage VDATA) in the emission period, the second signal may turn on the blocking transistor T10 to transmit the driving current.

As described above, when the write transistor T2 and/or the compensation transistor T3 is opened due to a crack, deformation, etc., the display device may prevent the bright spots through the blocking transistor T10.

Figure 15:
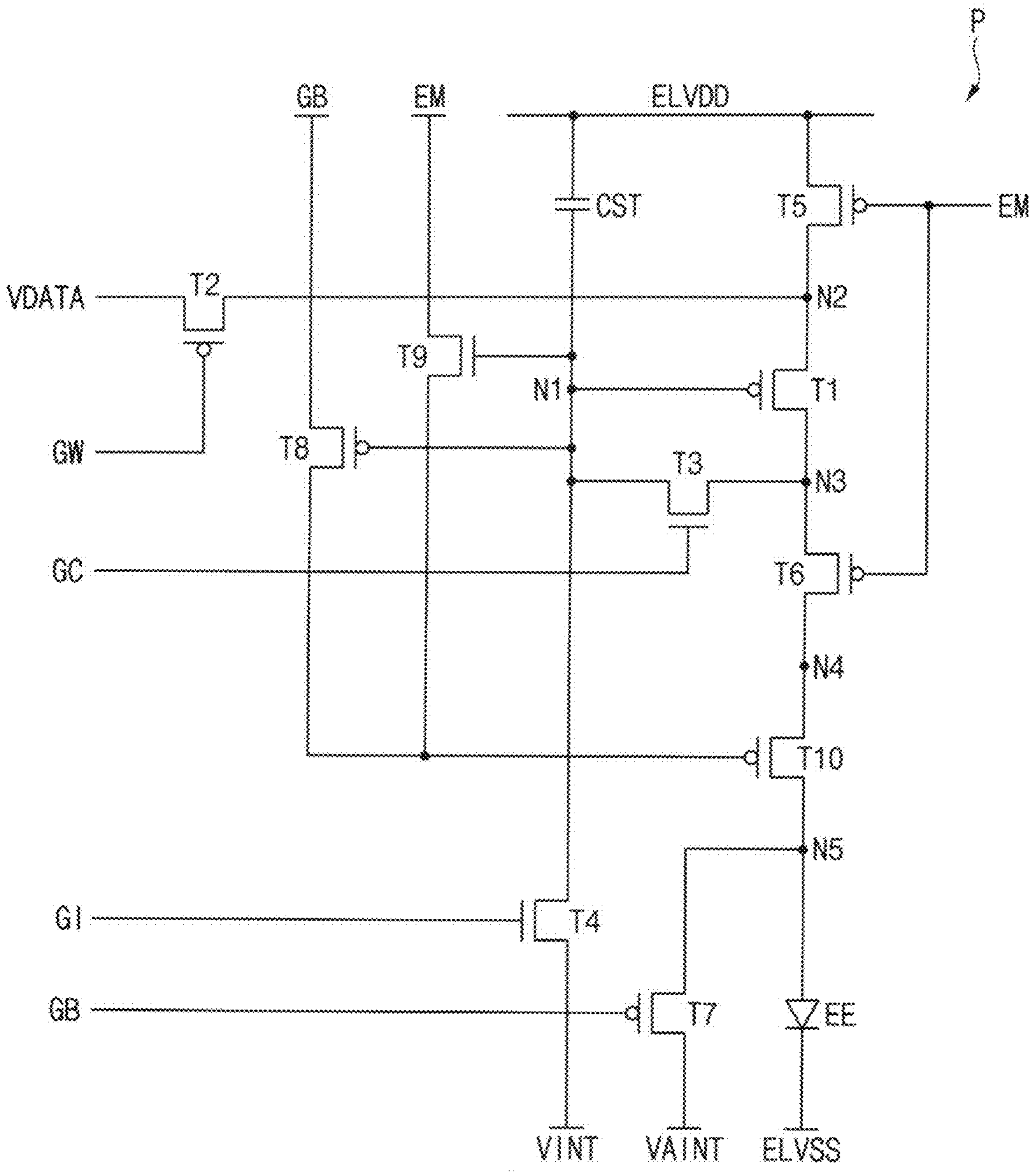
FIG. 15 is a circuit diagram illustrating an embodiment of a pixel circuit P of a display device according to the inventive concept.

FIG. 15 is a circuit diagram illustrating an embodiment of the pixel circuit P of a display device according to the inventive concept.

The display device in the illustrated embodiment is substantially the same as the display device of FIG. 1 except for a signal applied to the first electrode of the first blocking control transistor T8. Thus, the same reference numerals are used to refer to the same or similar element, and any repetitive explanation will be omitted.

Referring to FIG. 15, the first signal may be the bias gate signal GB. That is, the first electrode of the first blocking control transistor T8 may receive the bias gate signal GB. In this case, the blocking transistor T10 may be the same type as the second initialization transistor T7. In an embodiment, the second initialization transistor T7 and the blocking transistor T10 may be the p-type transistors, for example.

Figure 16:
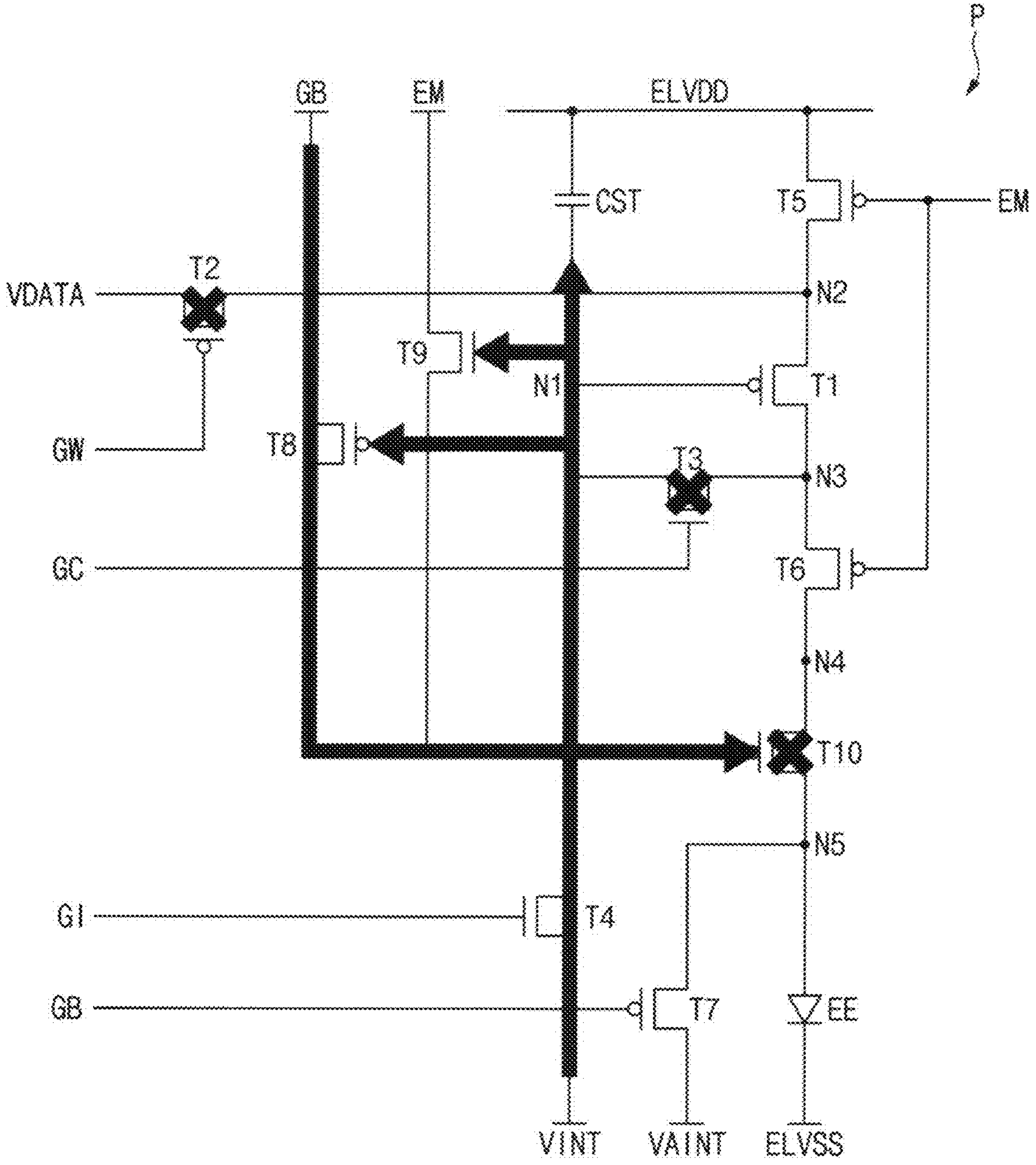
FIG. 16 is a circuit diagram illustrating an embodiment in which the display device of FIG. 15 drives a pixel circuit in an initialization period when a write transistor and a compensation transistor are opened.

FIG. 16 is a circuit diagram illustrating an embodiment in which the display device of FIG. 11 drives the pixel circuit P in the initialization period when the write transistor T2 and the compensation transistor T3 are opened.

Referring to FIG. 16, in the initialization period, the initialization gate signal GI may have the high voltage level, and the first initialization transistor T4 may be turned on. Accordingly, the gate initialization voltage VINT may be applied to the first node N1 (i.e., the gate initialization operation). That is, the control electrode of the driving transistor T1 (i.e., the data voltage VDATA written in the storage capacitor CST) may be initialized.

The first initialization voltage VINT may be the low power voltage. Accordingly, the first initialization voltage VINT may have the low voltage level, and the first blocking control transistor T8 may be turned on. Accordingly, the bias gate signal GB may be applied to the control electrode of the blocking transistor T10. At this time, since the bias gate signal GB has the high voltage level, the blocking transistor T10 may be turned off.

Figure 17:
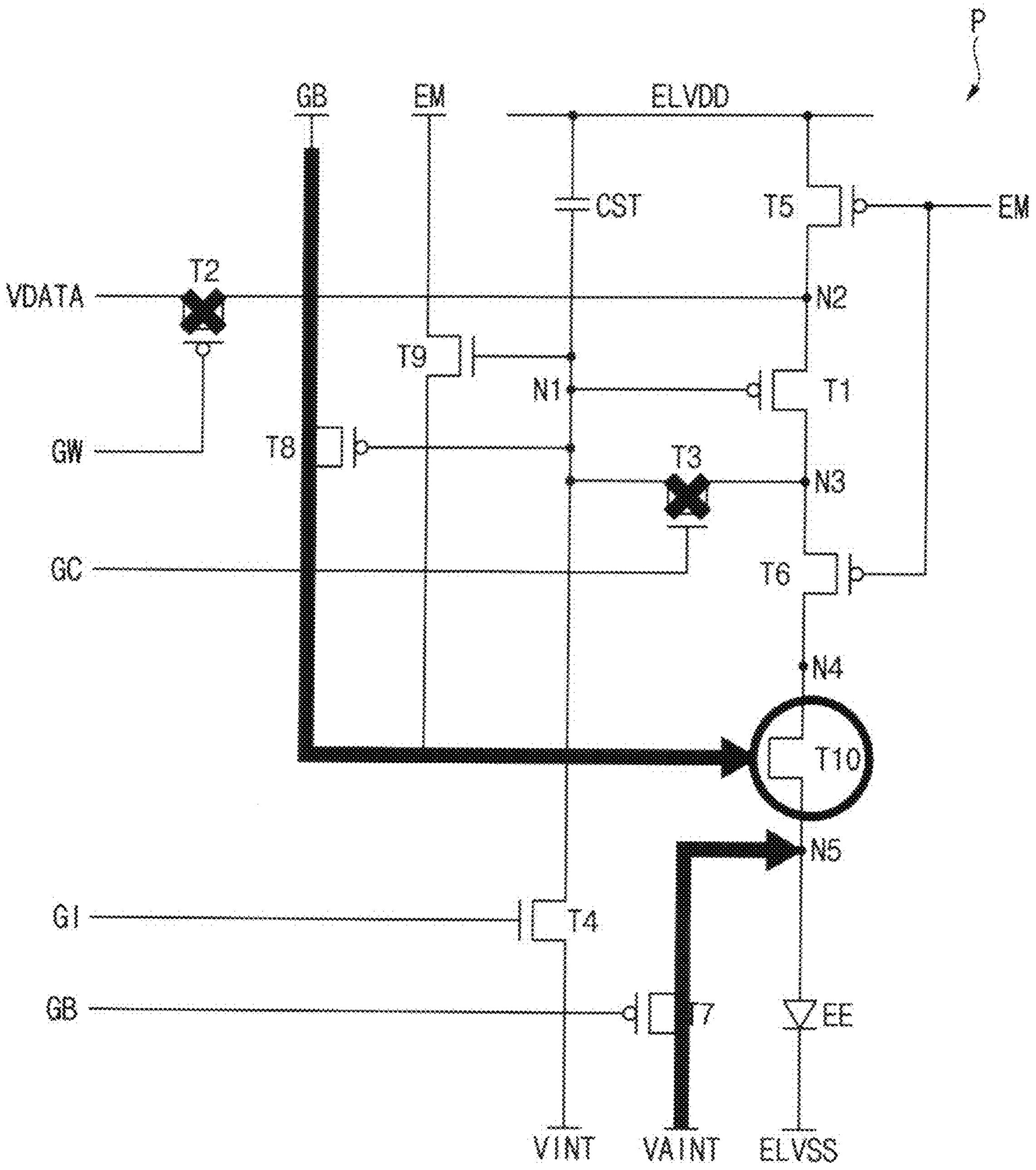
FIG. 17 is a diagram illustrating an embodiment in which the display device of FIG. 15 drives a pixel circuit in an anode initialization period when a write transistor and a compensation transistor are opened.

FIG. 17 is a diagram illustrating an embodiment in which the display device of FIG. 15 drives the pixel circuit P in the anode initialization period when the write transistor T2 and the compensation transistor T3 are opened.

Referring to FIG. 17, in the anode initialization period, the bias gate signal GB may have the low voltage level, and the second initialization transistor T7 may be turned on. Accordingly, the anode initialization voltage VAINT may be applied to the first electrode (i.e., the anode electrode) of the light-emitting element EE (i.e., the anode initialization operation). Also, since the bias gate signal GB has the low voltage level, the blocking transistor T10 may be turned on.

Figure 18:
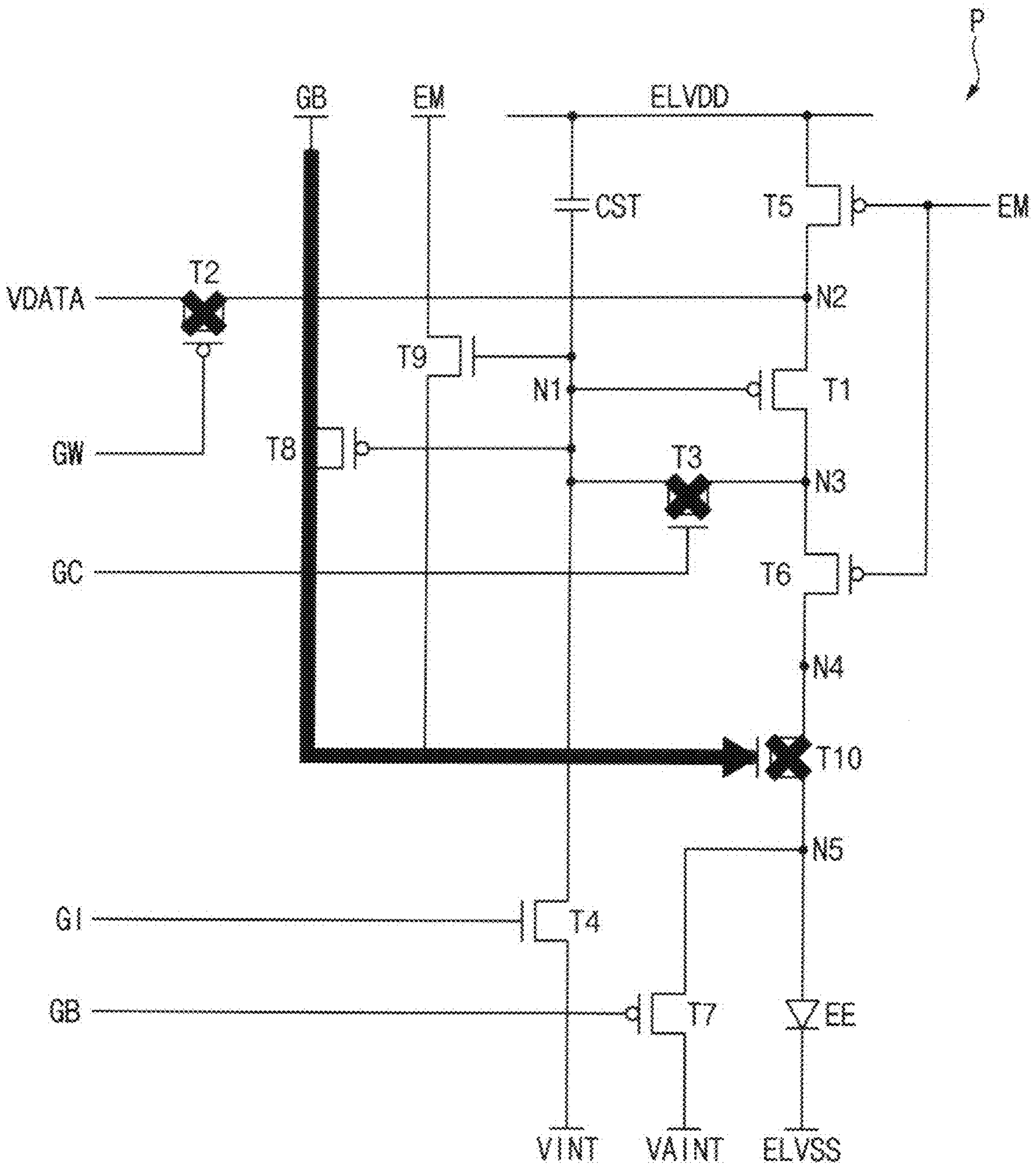
FIG. 18 is a diagram illustrating an embodiment in which the display device of FIG. 15 drives a pixel circuit in a data write period when a write transistor and a compensation transistor are opened.

FIG. 18 is a diagram illustrating an embodiment in which the display device of FIG. drives the pixel circuit P in the data write period when the write transistor T2 and the compensation transistor T3 are opened.

Referring to FIG. 18, in the data write period, since the write transistor T2 and the compensation transistor T3 are opened, the data voltage VDATA may not be written.

Since the data voltage VDATA is not written in the storage capacitor CST, the voltage of the first node N1 may still have the low voltage level (i.e., the first initialization voltage VINT). Accordingly, the first blocking control transistor T8 may be turned on. Accordingly, the bias gate signal GB may be applied to the control electrode of the blocking transistor T10. At this time, since the bias gate signal GB has the low voltage level, the blocking transistor T10 may be turned on.

Figure 19:
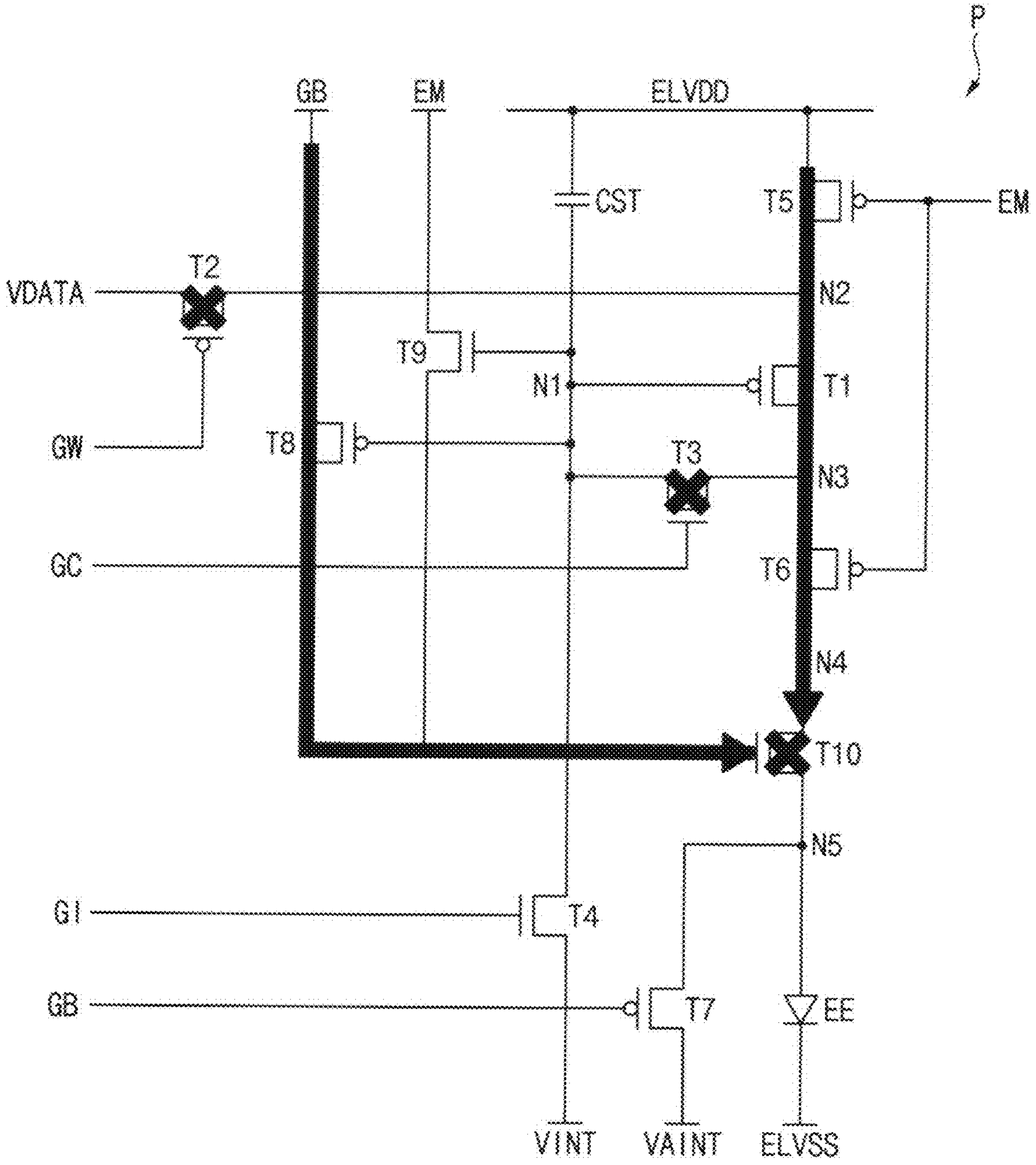
FIG. 19 is a diagram illustrating an embodiment in which the display device of FIG. 15 drives a pixel circuit in an emission period when a write transistor and a compensation transistor are opened.

FIG. 19 is a diagram illustrating an embodiment in which the display device of FIG. 15 drives the pixel circuit P in the emission period when the write transistor T2 and the compensation transistor T3 are opened.

Referring to FIG. 19, in the emission period, the emission signal EM may have the low voltage level, and the first emission transistor T5 and the second emission transistor T6 may be turned on. Accordingly, the first power voltage ELVDD may be applied to the driving transistor T1 to generate the driving current. However, since the voltage stored in the storage capacitor CST is the first initialization voltage VINT and the driving transistor T1 is the p-type transistor, the driving current may be substantially large. Accordingly, when the driving current flows to the light-emitting element EE, a bright point may be generated due to the corresponding pixel circuit P.

However, since the first initialization voltage VINT is stored in the storage capacitor CST, the voltage of the first node N1 may have the low voltage level. Accordingly, the first blocking control transistor T8 may be turned on. Accordingly, the bias gate signal GB may be applied to the control electrode of the blocking transistor T10. At this time, since the bias gate signal GB has the high voltage level, the blocking transistor T10 may be turned off. Accordingly, the driving current may be blocked.

That is, when a voltage of the control electrode of the driving transistor T1 has the low voltage level (e.g., the first initialization voltage VINT) in the emission period, the first signal may turn off the blocking transistor T10 to block the driving current. In addition, when the voltage of the control electrode of the driving transistor T1 has the high voltage level (e.g., the data voltage VDATA) in the emission period, the second signal may turn on the blocking transistor T10 to transmit the driving current.

As described above, when the write transistor T2 and/or the compensation transistor T3 is opened due to a crack, deformation, etc., the display device may prevent the bright spots through the blocking transistor T10.

Figure 20:
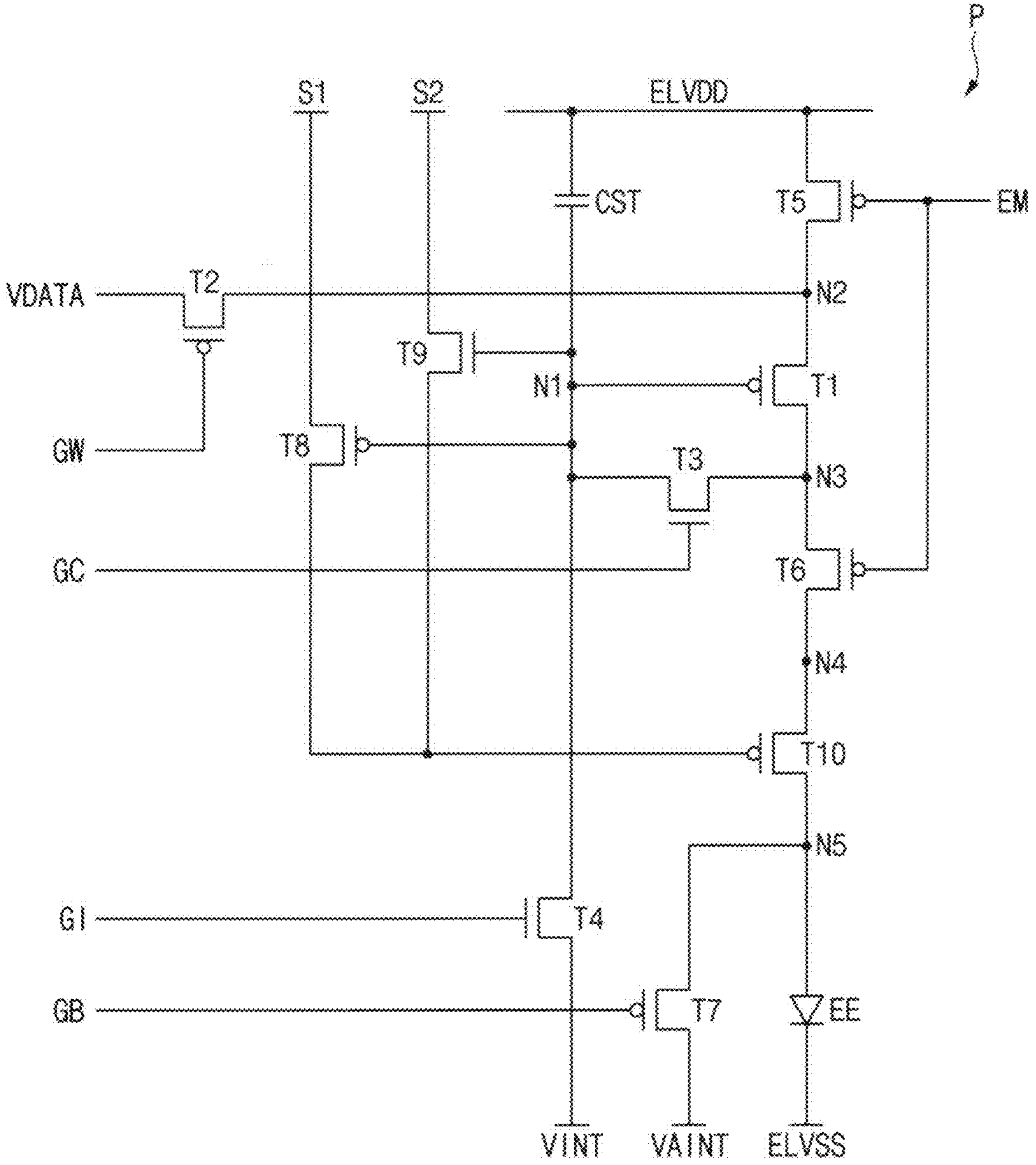
FIG. 20 is a circuit diagram illustrating an embodiment of a pixel circuit of a display device according to the inventive concept.

FIG. 20 is a circuit diagram illustrating an embodiment of the pixel circuit P of a display device according to the inventive concept.

The display device in the illustrated embodiment is substantially the same as the display device of FIG. 1 except for a signal applied to the first electrodes of the first and second blocking control transistors T8 and T9. Thus, the same reference numerals are used to refer to the same or similar element, and any repetitive explanation will be omitted.

Referring to FIG. 20, the first signal S1 may be applied to the first electrode of the first blocking control transistor T8. The display device of FIG. 1 and the display device of FIG. use the existing write gate signal GW or the existing bias gate signal GB as the first signal S1, but are not limited thereto. In an embodiment, the first signal S1 may be a separate signal having the inactivation level applied to the blocking transistor T10 in the emission period, for example.

The second signal S2 may be applied to the first electrode of the second blocking control transistor T9. The display device of FIG. 1 and the display device of FIG. 15 use the existing emission signal EM as the second signal S2, but are not limited thereto. In an embodiment, the second signal S2 may be a separate signal having the activation level applied to the blocking transistor T10 in the emission period, for example.

Figure 21:
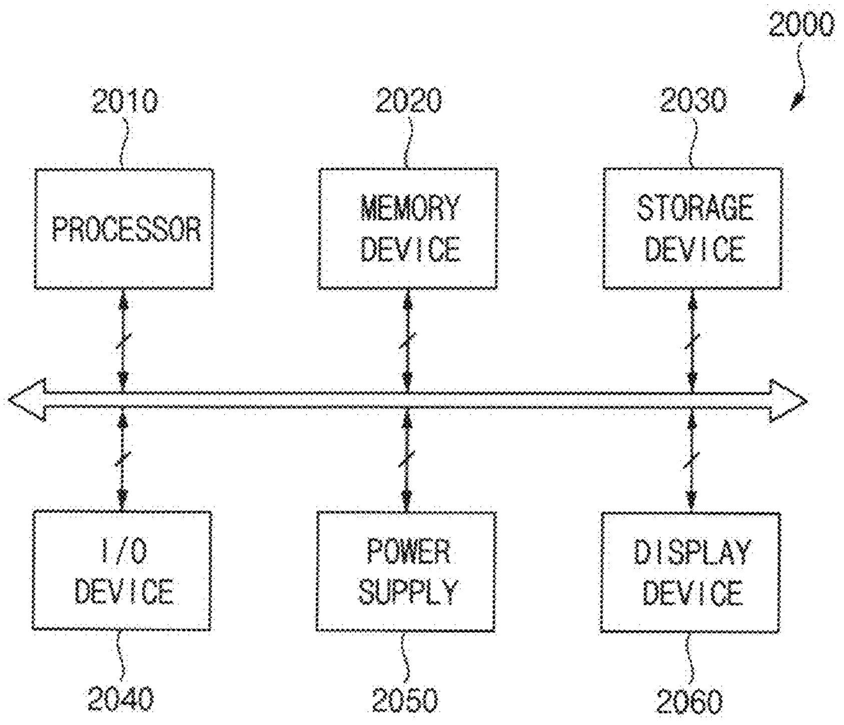
FIG. 21 is a block diagram showing an electronic device according to the inventive concept.
Figure 22:
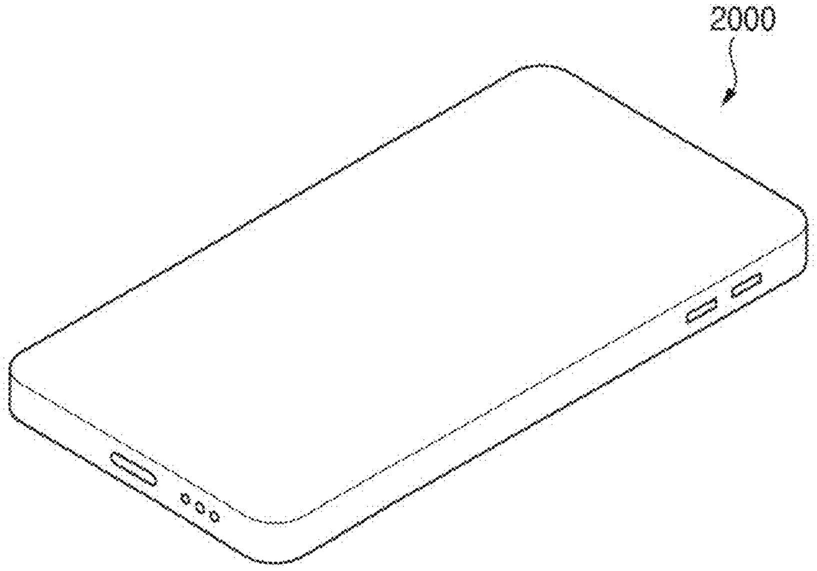
FIG. 22 is a diagram showing an embodiment in which the electronic device of FIG. 21 is implemented as a smart phone.

FIG. 21 is a block diagram showing an electronic device in embodiments of the inventive concept, and FIG. 22 is a diagram showing an embodiment in which the electronic device of FIG. 21 is implemented as a smart phone.

Referring to FIGS. 21 and 22, the electronic device 2000 may include a processor 2010, a memory device 2020, a storage device 2030, an input/output ("I/O") device 2040, a power supply 2050, and a display device 2060. Here, the display device 2060 may be the display device of FIG. 1. In addition, the electronic device 2000 may further include a plurality of ports for communicating with a video card, a sound card, a memory card, a universal serial bus ("USB") device, other electronic devices, etc. In an embodiment, as shown in FIG. 22, the electronic device 2000 may be implemented as a smart phone. However, the electronic device 2000 is not limited thereto. In an embodiment, the electronic device 2000 may be implemented as a cellular phone, a video phone, a smart pad, a smart watch, a tablet personal computer ("PC"), a car navigation system, a computer monitor, a laptop, a head disposed (e.g., mounted) display ("HMD") device, etc.

The processor 2010 may perform various computing functions. The processor 2010 may be a microprocessor, a central processing unit ("CPU"), an application processor ("AP"), etc. The processor 2010 may be coupled to other components via an address bus, a control bus, a data bus, etc. Further, the processor 2010 may be coupled to an extended bus such as a peripheral component interconnection ("PCI") bus.

The memory device 2020 may store data for operations of the electronic device 2000. In an embodiment, the memory device 2020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 2030 may include a solid state drive ("SSD") device, a hard disk drive ("HDD") device, a compact disc read-only memory ("CD-ROM") device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. In an embodiment, the power supply 2050 may be a power management integrated circuit ("PMIC"), for example.

The display device 2060 may display an image corresponding to visual information of the electronic device 2000. In an embodiment, the display device 2060 may be an organic light-emitting display device or a quantum dot light-emitting display device, for example, but is not limited thereto. The display device 2060 may be coupled to other components via the buses or other communication links. Here, the display device 2060 may block the driving current flowing to the light-emitting element when the data voltage is not written. The display device 2060 may prevent the bright spots generated when a crack, deformation, etc. occurs in a transistor included in the pixel circuit.

The inventive concepts may be applied to any electronic device including the display device. In an embodiment, the inventive concepts may be applied to a television ("TV"), a digital TV, a three-dimensional ("3D") TV, a mobile phone, a smart phone, a tablet computer, a virtual reality ("VR") device, a wearable electronic device, a PC, a home appliance, a laptop computer, a personal digital assistant ("PDA"), a portable multimedia player ("PMP"), a digital camera, a music player, a portable game console, a navigation device, etc., for example.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the illustrative embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit comprising:

a light-emitting element;

a write transistor which writes a data voltage;

a driving transistor which generates a driving current based on the data voltage and applies the driving current to the light-emitting element;

a first initialization transistor which applies a first initialization voltage to a control electrode of the driving transistor;

a blocking transistor disposed between the light-emitting element and the driving transistor;

a first blocking control transistor including:

a control electrode connected to the control electrode of the driving transistor;

a first electrode which receives a first signal; and a second electrode connected to a control electrode of the blocking transistor; and a second blocking control transistor including a control electrode connected to the control electrode of the driving transistor, a first electrode which receives a second signal, and a second electrode connected to the control electrode of the blocking transistor.

2. The pixel circuit of claim 1, wherein the first blocking control transistor is a p-type transistor, and wherein the second blocking control transistor is an n-type transistor.

3. The pixel circuit of claim 2, wherein the first signal has an inactivation level in an emission period in which the driving current is generated.

4. The pixel circuit of claim 3, wherein the second signal has an activation level in the emission period.

5. The pixel circuit of claim 1, wherein the write transistor writes the data voltage in response to a write gate signal, and wherein the first signal is the write gate signal.

6. The pixel circuit of claim 5, wherein the blocking transistor is a same type as the write transistor.

7. The pixel circuit of claim 1, further comprising:

a second initialization transistor which applies a second initialization voltage to an anode electrode of the light-emitting element in response to a bias gate signal, wherein the first signal is the bias gate signal.

8. The pixel circuit of claim 7, wherein the blocking transistor is a same type as the second initialization transistor.

9. The pixel circuit of claim 1, further comprising:

a first emission transistor including a control electrode which receives an emission signal, a first electrode which receives a first power voltage, and a second electrode connected to a first electrode of the driving transistor; and a second emission transistor including a control electrode which receives the emission signal, a first electrode connected to a second electrode of the driving transistor, and a second electrode connected to a first electrode of the blocking transistor, wherein the second signal is the emission signal.

10. The pixel circuit of claim 1, wherein the driving transistor includes the control electrode connected to a first node, a first electrode connected to a second node, and a second electrode connected to a third node, wherein the write transistor includes a control electrode which receives a write gate signal, a first electrode which receives the data voltage, and a second electrode connected to the second node, wherein the first initialization transistor includes a control electrode which receives an initialization gate signal, a first electrode which receives the first initialization voltage, and a second electrode connected to the first node, wherein the blocking transistor includes the control electrode, a first electrode connected to a fourth node, and a second electrode connected to a fifth node, and wherein the light-emitting element includes a first electrode connected to the fifth node and a second electrode which receives a second power voltage.

11. The pixel circuit of claim 10, further comprising:

a compensation transistor including a control electrode which receives a compensation gate signal, a first electrode connected to the third node, and a second electrode connected to the first node;

a first emission transistor including a control electrode which receives an emission signal, a first electrode which receives a first power voltage, and a second electrode connected to the second node;

a second emission transistor including a control electrode which receives the emission signal, a first electrode connected to the third node, and a second electrode connected to the fourth node;

a second initialization transistor including a control electrode which receives a bias gate signal, a first electrode which receives a second initialization voltage, and a second electrode connected to the fifth node; and a storage capacitor including a first electrode which receives the first power voltage and a second electrode connected to the first node.

12. A display device comprising:

a display panel including pixel circuits;

a data driver which provides a data voltage to each of the pixel circuits;

a gate driver which provides gate signals to each of the pixel circuits; and a timing controller which controls the data driver and the gate driver, wherein each of the pixel circuits includes:

a light-emitting element;

a write transistor which writes the data voltage;

a driving transistor which generates a driving current based on the data voltage and applies the driving current to the light-emitting element;

a first initialization transistor which applies a first initialization voltage to a control electrode of the driving transistor;

a blocking transistor disposed between the light-emitting element and the driving transistor;

a first blocking control transistor including:

a control electrode connected to the control electrode of the driving transistor;

a first electrode which receives a first signal; and a second electrode connected to a control electrode of the blocking transistor; and a second blocking control transistor including:

a control electrode connected to the control electrode of the driving transistor;

a first electrode which receives a second signal; and a second electrode connected to the control electrode of the blocking transistor.

13. The display device of claim 12, wherein the first blocking control transistor is a p-type transistor, and wherein the second blocking control transistor is an n-type transistor.

14. The display device of claim 13, wherein the first signal has an inactivation level in an emission period in which the driving current is generated.

15. The display device of claim 14, wherein the second signal has an activation level in the emission period.

16. The display device of claim 12, wherein the gate signals includes a write gate signal, wherein the write transistor writes the data voltage in response to the write gate signal, and wherein the first signal is the write gate signal.

17. The display device of claim 16, wherein the blocking transistor is a same type as the write transistor.

18. The display device of claim 12, wherein the gate signals includes a bias gate signal, wherein each of the pixel circuits includes a second initialization transistor which applies a second initialization voltage to an anode electrode of the light-emitting element in response to the bias gate signal, and wherein the first signal is the bias gate signal.

19. The display device of claim 18, wherein the blocking transistor is a same type as the second initialization transistor.

20. The display device of claim 12, further comprising:

an emission driver which provides an emission signal to each of the pixel circuits, wherein the pixel circuits includes:

a first emission transistor including a control electrode which receives the emission signal, a first electrode which receives a first power voltage, and a second electrode connected to a first electrode of the driving transistor; and a second emission transistor including a control electrode which receives the emission signal, a first electrode connected to a second electrode of the driving transistor, and a second electrode connected to a first electrode of the blocking transistor, and wherein the second signal is the emission signal.

* * * * *